US010275357B2

(12) United States Patent
Choi et al.

(10) Patent No.: US 10,275,357 B2
(45) Date of Patent: Apr. 30, 2019

(54) SYSTEM AND METHODS FOR ADAPTIVE MULTI-LEVEL CACHE ALLOCATION FOR KV STORE

(71) Applicant: Samsung Electronics Co., Ltd., Suwon-si, Gyeonggi-do (KR)

(72) Inventors: Inseok Stephen Choi, San Jose, CA (US); Byoung Young Ahn, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 319 days.

(21) Appl. No.: 15/096,255

(22) Filed: Apr. 11, 2016

(65) Prior Publication Data
US 2017/0206164 A1    Jul. 20, 2017

Related U.S. Application Data

(60) Provisional application No. 62/279,658, filed on Jan. 15, 2016.

(51) Int. Cl.
*G06F 11/34* (2006.01)
*G06F 17/30* (2006.01)
(Continued)

(52) U.S. Cl.
CPC .......... *G06F 12/0871* (2013.01); *G06F 11/34* (2013.01); *G06F 12/0875* (2013.01); *G06F 12/0897* (2013.01); *G06F 17/30306* (2013.01); *G06F 12/0873* (2013.01); *G06F 2212/1024* (2013.01); *G06F 2212/1028* (2013.01);
(Continued)

(58) Field of Classification Search
CPC ............ G06F 12/0871; G06F 12/0875; G06F 12/0897; G06F 12/0873; G06F 12/0811; G06F 11/34; G06F 17/30306; G06F 2212/7201; G06F 2212/1024; G06F 2212/601; G06F 2212/305; G06F 2212/1028; G06F 2212/163; G06F 2212/214; G06F 2212/284; G06F 2212/313; G06F 2212/465; G06F 2212/604;
(Continued)

(56) References Cited

U.S. PATENT DOCUMENTS 7,831,634 B2    11/2010  Petev et al.
8,010,337 B2     8/2011  Narayanan et al.
(Continued)

OTHER PUBLICATIONS

Office Action for U.S. Appl. No. 15/096,267 dated Jun. 27, 2018.
Notice of Allowance for U.S. Appl. No. 15/096,267 dated Jan. 3, 2019.

*Primary Examiner* — Shane D Woolwine
(74) *Attorney, Agent, or Firm* — Renaissance IP Law Group LLP

(57) ABSTRACT

In a multi-level cache system, a logic may be responsible for calculating the appropriate sizes for a database cache and a key-value store. Reception circuitry may receive a hit rate for the database cache, a reuse distance for the key-value store, and a user-selected quality of server. An adaption calculator may then calculate a target size for the database cache and a target size for the key-value store. Transmission circuitry may then transmit the target size for the database cache and the target size for the key-value store for use in the multi-level cache system.

23 Claims, 19 Drawing Sheets

(51) Int. Cl.
*G06F 12/0871* (2016.01)
*G06F 12/0873* (2016.01)
*G06F 12/0875* (2016.01)
*G06F 12/0897* (2016.01)

(52) U.S. Cl.
CPC ........... *G06F 2212/1044* (2013.01); *G06F 2212/163* (2013.01); *G06F 2212/214* (2013.01); *G06F 2212/284* (2013.01); *G06F 2212/305* (2013.01); *G06F 2212/313* (2013.01); *G06F 2212/465* (2013.01); *G06F 2212/601* (2013.01); *G06F 2212/604* (2013.01); *G06F 2212/7201* (2013.01); *G06F 2216/05* (2013.01); *Y02D 10/13* (2018.01)

(58) Field of Classification Search
CPC ......... G06F 2212/1044; G06F 2216/05; G06F 2212/605; Y02D 10/13
USPC ................ 711/103, 118, 119, 122, 151
See application file for complete search history.

(56) References Cited

U.S. PATENT DOCUMENTS

| | | | |
|---|---|---|---|
| 8,996,563 | B2 | 3/2015 | Bender et al. |
| 2008/0046628 | A1 | 2/2008 | Hunsaker et al. |
| 2010/0017624 | A1 | 1/2010 | Chan et al. |
| 2011/0246503 | A1* | 10/2011 | Bender ............ G06F 17/30306 707/769 |
| 2012/0072656 | A1 | 3/2012 | Archak et al. |
| 2013/0275656 | A1* | 10/2013 | Talagala ............ G06F 12/0246 711/103 |
| 2013/0297655 | A1 | 11/2013 | Narasayya et al. |
| 2014/0047176 | A1* | 2/2014 | Poddar ................ G06F 1/3275 711/106 |
| 2014/0310462 | A1* | 10/2014 | Waldspurger ....... G06F 12/0891 711/118 |
| 2014/0325115 | A1 | 10/2014 | Ramsundar et al. |
| 2015/0067262 | A1* | 3/2015 | Uttamchandani ... G06F 12/0848 711/129 |
| 2016/0321294 | A1 | 11/2016 | Wang et al. |

* cited by examiner

SYSTEM AND METHODS FOR ADAPTIVE MULTI-LEVEL CACHE ALLOCATION FOR KV STORE

RELATED APPLICATION DATA

This application claims the benefit of U.S. Provisional Patent Application Ser. No. 62/279,658, filed Jan. 15, 2016, which is incorporated by reference herein for all purposes.

FIELD

This inventive concept relates to databases, and more particularly to improving caching of large databases using Solid State Drives (SSDs).

BACKGROUND

This is the era of Big Data. We are surrounded by cloud computing and enormous amounts of data are being processed and stored in data centers. For fast data retrieval and interactive and fast web services, NoSQL databases (or key-value stores) are prevalent. For example, Facebook and other SNS providers commonly deploy hundreds and thousands of such services. In particular, memcached database caching software is popular for its fast accesses and light implementations.

There are huge gaps in the average performance, cost, and energy gaps in existing single-layer caching-with-backend database architecture. For example, an average access or service time for memcached software is around 10-20 micro seconds, whereas a backend SQL database query may take 20 milliseconds: up to 2000 times slower. Decent servers for running SQL databases could easily cost $30,000.00 dollars. Power consumptions for different servers also vary significantly. For example, small servers could burn 200 watts while large servers may burn as much as 1,500 watts. Nor is it effective to increase the memory capacity of the server: memory is itself very expensive and requires significant power.

A need remains for a way to improve the performance of large databases and to balance the two objectives of minimizing latency and keeping cost down.

DETAILED DESCRIPTION

Figure 1:
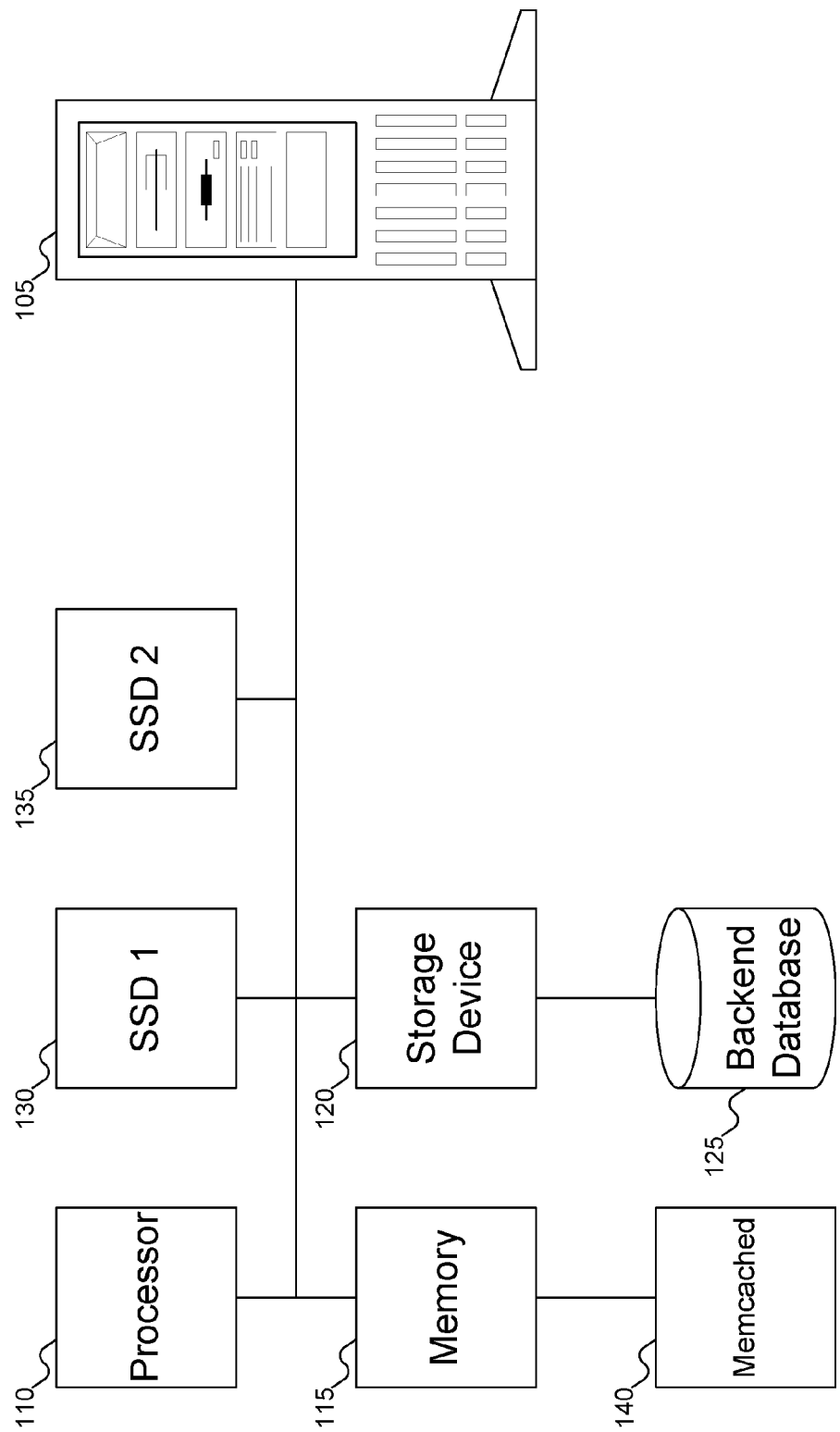
FIG. 1 shows a server implementing a multi-level cache system using both memory and a Solid State Drive (SSD) with a key-value store, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Adding a new server entails significant cost, with potentially little improvement in the latency of database queries. Increasing the memory used by key-value caching software such as memcached may improve the latency of database queries, but also involve significant cost, and there are upper bounds on how much memory may be installed in a server. But using a Solid State Drive (SSD) to implement a key-value store may significantly increase the capacity of a database system with low cost and low power consumption relative to either memory increases or new servers. For example, SSDs may consume less than 20 watts to add terabytes of data; increasing the memory of a server by a similar capacity may easily require 100,000 watts. And while SSDs tend to be slower to access than memory, queries to SSDs may be around 60-150 microseconds, which is significantly faster than queries to the backend database. Thus, introducing SSDs into the mix may reduce the overall latency of database queries.

FIG. 1 shows a server implementing a multi-level cache system using both memory and a Solid State Drive (SSD) with a key-value store, according to an embodiment of the inventive concept. In FIG. 1, server 105 may include processor 110 and memory 115. Processor 110 may be any variety of processor, such as Intel's Celeron and Xeon processors; server 105 may also include multiple processors, if desired. Memory 115 may be any variety of memory, such as flash memory or Static Random Access Memory (RAM), but typically is Dynamic RAM.

Server 105 may include any number of storage devices. In FIG. 1, server 105 is shown as including storage device 120, on which is stored backend database 125. Storage device 125 may be any desired variety of storage device, such as hard disk drives and flash storage. Server 105 may also include SSDs 130 and 135, which may act as key-value stores. While FIG. 1 shows two SSDs 130 and 135, other embodiments of the inventive concept may support any number of SSDs or other types of storage.

Server 105 may have key-value cache system 140 installed and running in memory 115. In FIG. 1, key-value cache system 140 is shown as memcached, which is a commonly used key-value cache system; but key-value cache system 140 may be replaced with any other desired key-value cache system: for example, redis. Key-value cache system 140 provides fast access to information that would otherwise be obtained from backend database 125, which would be slower to access.

SSDs 130 and 135 may act as key-value stores for backend database 125. While slower than accessing memory 115, SSDs 130 and 135 are faster to access than backend database 125, resulting in a quicker response. SSDs 130 and 135 may also provide significantly greater capacity than might be offered by memory 115. In this manner, key-value cache system 140 and the key-value stores in SSDs 130 and 135 may act as a multi-level cache, similar to how convention memory may include both L1 and L2 caches. One cache (key-value cache system 140) is faster, but with lower capacity; the other cache (the key-value stores in SSDs 130 and 135) are slower, but with greater capacity.

SSDs 130 and 135 also have the benefit of far lower power consumption than would be required by increasing memory 140 or adding a new server 105. Because SSDs 130 and 135 have lower power consumption, the cost of operation is reduced.

Instead of using a conventional block-based interface, SSDs 130 and 135 may be modified to use a key-value interface. That is, instead of requesting a value at a particular address, a request of the key-value stores in SSDs 130 and 135 may include a target key. SSDs 130 and 135 may then use internal mapping information to determine the address that corresponds to the target key and access the corresponding value. SSDs 130 and 135 may use a modified firmware to manage this new interface. SSDs 130 and 135 are discussed further with reference to FIG. 8 below.

Figure 2:
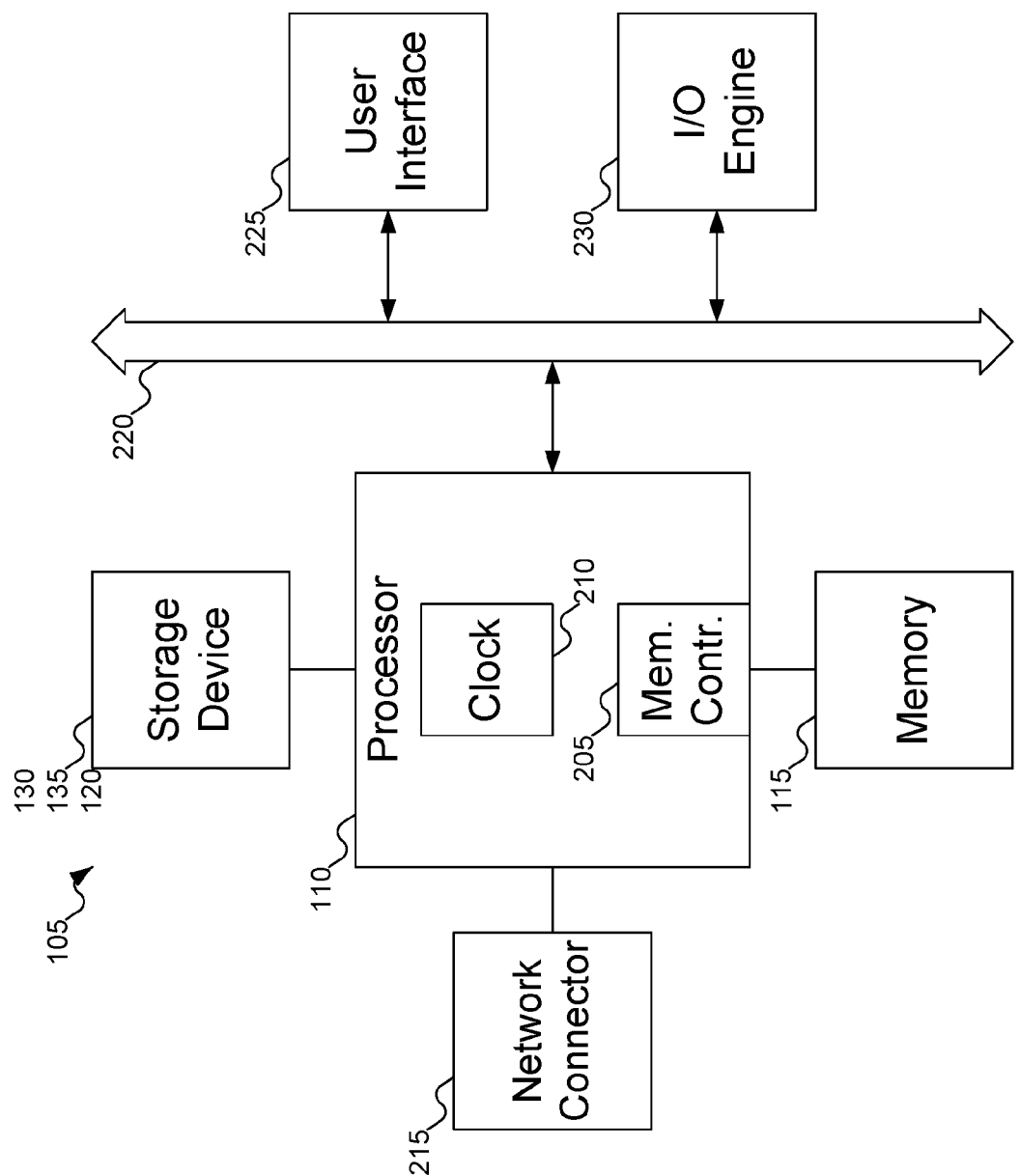
FIG. 2 shows additional details of the server of FIG. 1.

FIG. 2 shows additional details of server 105 of FIG. 1. Referring to FIG. 2, typically, machine or machines 105 include one or more processors 110, which may include memory controller 205 and clock 210, which may be used to coordinate the operations of the components of machine or machines 105. Processors 110 may also be coupled to memory 115, which may include random access memory (RAM), read-only memory (ROM), or other state preserving media, as examples. Processors 110 may also be coupled to storage devices 130 and 135, and to network connector 215, which may be, for example, an Ethernet connector or a wireless connector. Processors 110 may also be connected to a bus 220, to which may be attached user interface 225 and input/output interface ports that may be managed using input/output engine 230, among other components.

Figure 3:
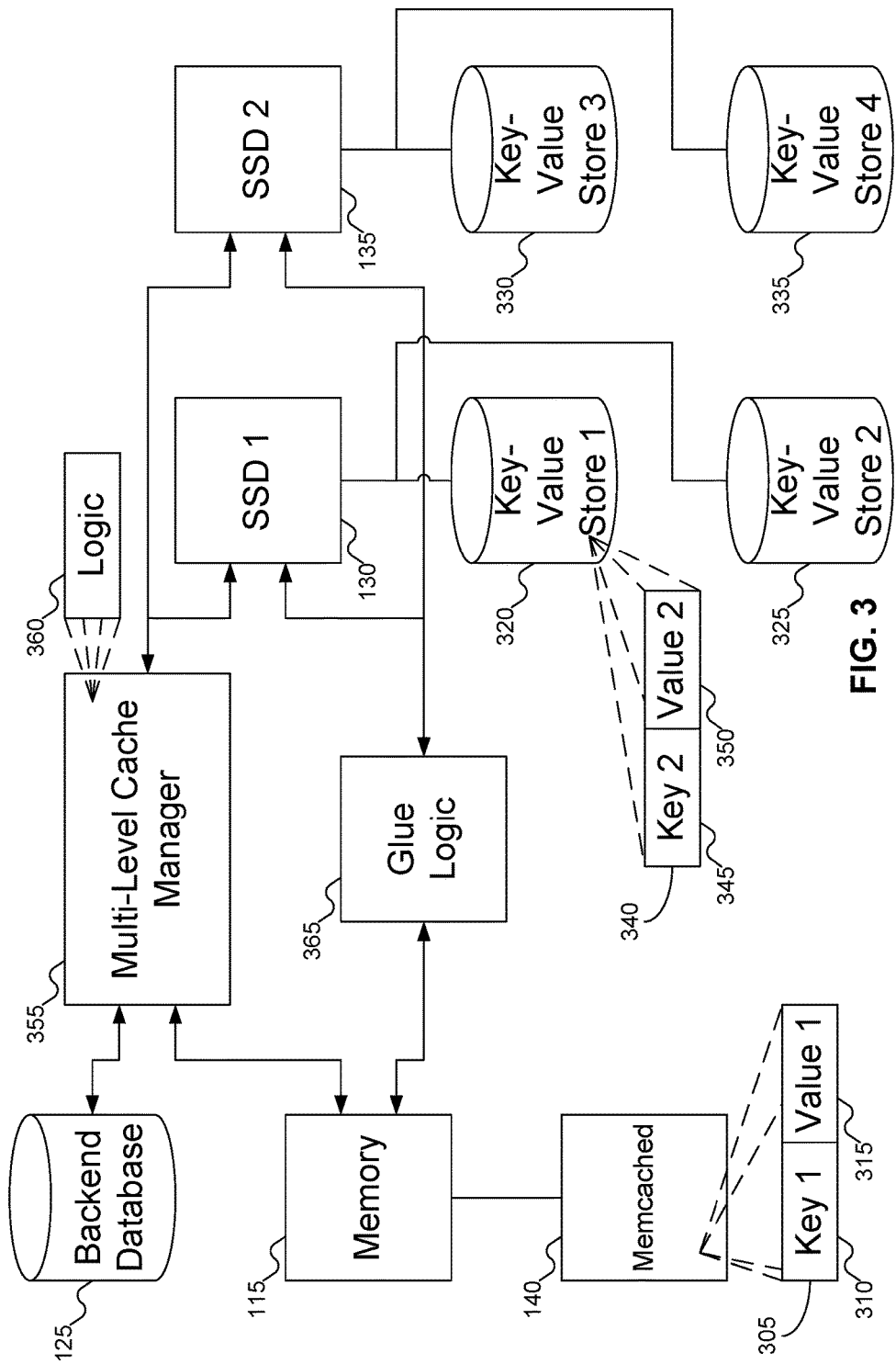
FIG. 3 shows an architecture of the multi-level cache system of FIG. 3, including the memory and SSDs of FIG. 3.

FIG. 3 shows an architecture of the multi-level cache system of FIG. 3, including memory 115 and SSDs 130 and 135 of FIG. 3. In FIG. 3, memory 115 and SSDs 130 and 135 are shown. Memory 115 again may include key-value cache system 140 (e.g., memcached), which is shown as including key-value pair 305 of key 310 and value 315. SSDs 130 and 135 may include key-value stores 320, 325, 330, and 335; key-value store 320 is shown as including key-value pair 340 of key 2 (345) and value 2 (350). Note that each SSD 130 and 135 may include more than one key-value store. Each key-value store may be for a different namespace (that is, for different databases). Thus, as there are four key-value stores 320, 325, 330, and 335 shown in FIG. 4, there may be four different namespaces supported by the multi-level cache system. While FIG. 3 shows each SSD 130 and 135 including two key-value stores, other embodiments of the inventive concept may support any number of key-value stores on each SSD. Key-value cache system 140, key-value stores 320, 325, 330, and 335, and backend database 125 together form a multi-level cache system. While FIG. 3 shows a multi-level cache system that includes two cache levels (key-value cache system 140 and key-value stores 320, 325, 330, and 335) aside from backend database 125, embodiments of the inventive concept may be extended to include any number of desired cache levels.

Multi-level cache manager 355 is responsible for managing the multi-level cache. More particularly, multi-level cache manager 355 is responsible for defining the multi-level cache hierarchy, and for configuring properties of the levels in the multi-level cache hierarchy, such as whether the cache is inclusive or exclusive, when to promote or demote a key-value pair from one level of the multi-level cache to another, and when to evict a key-value pair from a level of the multi-level cache. To that end, multi-level cache manager may communicate with memory 115 and SSDs 130 and 135, which store the various levels of the multi-level cache system.

Multi-level cache manager 355 may also include logic 360. Logic 360 may determine how much of memory 115 to allocate to key-value cache system 140 and how much of SSDs 130 and 135 to allocate to key-value stores 320, 325, 330, and 335. Logic 360 is discussed further with reference to FIG. 10 below.

Glue logic 365 may implement communication between the levels of the multi-level cache system. For example, glue logic 365 may communicate with memory 115 and SSDs 130 and 135 to submit requests for information and return the results of those requests. Glue logic 365 is discussed further with reference to FIG. 7 below.

Figure 4:
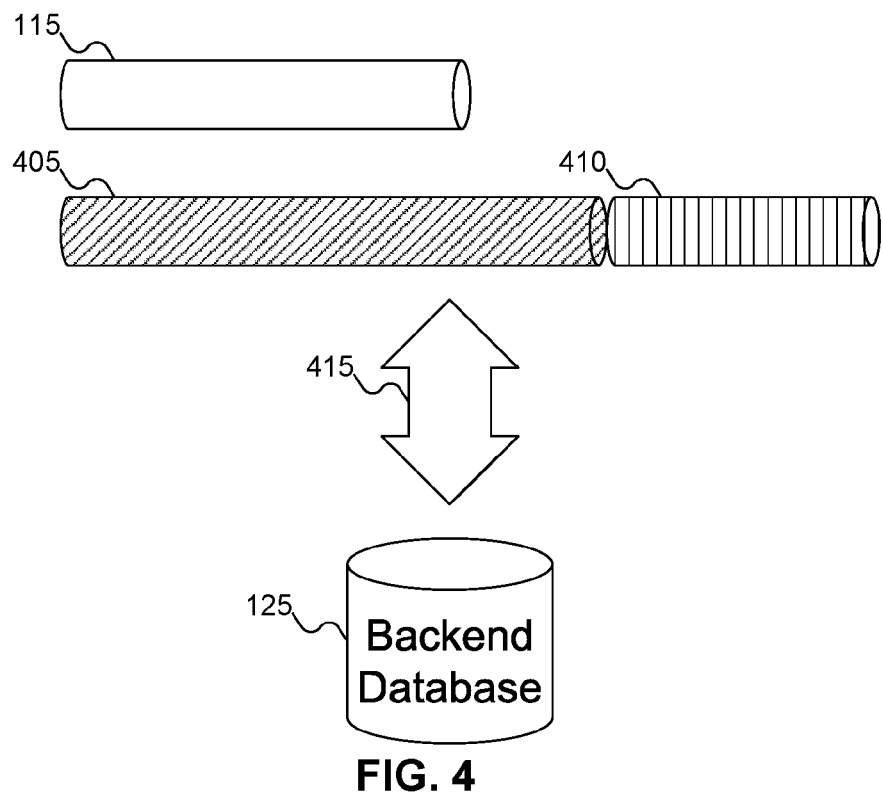
FIG. 4 shows an example of the available memory and memory requirements of two namespaces in a conventional system.

FIG. 4 shows an example of the available memory and memory requirements of two namespaces in a conventional system. In FIG. 4, memory 115 is shown, with the length of the cylindrical representation representing the capacity of memory 115.

Cylinders 405 and 410 may represent the required memory for each of two namespaces: again, the length of the cylinders may represent the required memory for in-memory caching. Thus, the namespace represented by cylinder 405 may require more memory than the namespace represented by cylinder 410. Note that cylinder 405 is larger than memory 115, indicating that the namespace represented by cylinder 405, by itself, requires more memory than is available on server 105 of FIG. 1: the namespace represented by cylinder 410 simply adds to the burden.

Because there is insufficient memory to support even the namespace represented by cylinder 405 by itself, memory 115 cannot entirely cache all the key-value pairs used by the namespaces. Thus, many requests for values must be sent to backend database 125: this heavy traffic is shown by wide arrow 415.

Figure 5:
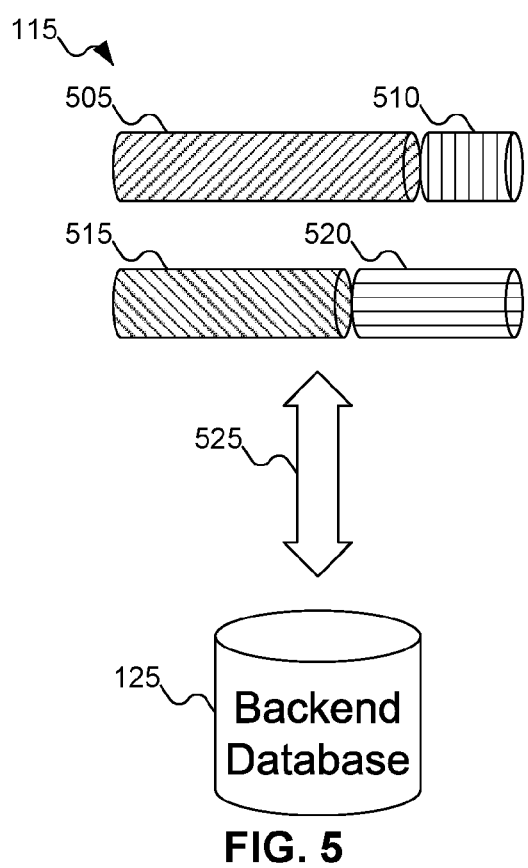
FIG. 5 shows an example allocation of the memory and key-value store for the namespaces of FIG. 4 using the multi-level cache system of FIG. 3.

In contrast to FIG. 4, FIG. 5 shows an example allocation of the memory and key-value store for the namespaces of FIG. 4 using the multi-level cache system of FIG. 3. The total required space for the namespaces is unchanged from FIG. 4 to FIG. 5. Memory 115 is allocated partly to the first namespace (as shown by cylinder 505) and partly to the second namespace (as shown by cylinder 510). But with the addition of key-value stores, the excess required space for the namespaces may be assigned to the key-value stores. As with FIG. 4, the key-value stores in FIG. 5 are shown as cylinders, with the length of the cylinder representing the allocated space. Thus, key-value store 320 may be allocated the excess space (shown as cylinder 515) required by the first namespace, and key-value store 325 may be allocated the excess space (shown as cylinder 520) required by the second namespace. By using key-value stores 320 and 325 as second-level caches, the traffic to backend database 125 is greatly reduced, as shown by narrow arrow 525.

Figure 6:
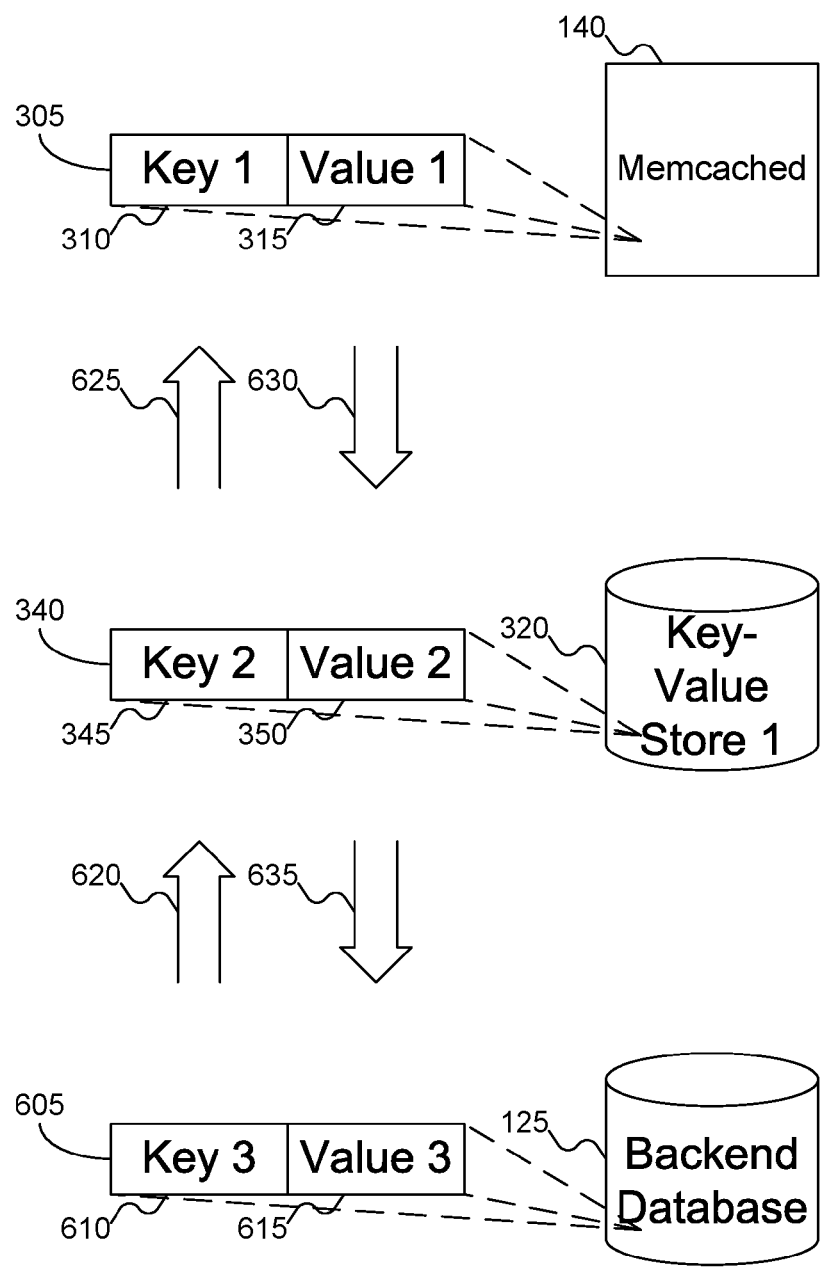
FIG. 6 shows the multi-level cache system of FIG. 3 promoting and demoting key-value pairs between the key-value cache system of FIG. 1, the key-value store of FIG. 3, and the backend database of FIG. 1.

FIG. 6 shows the multi-level cache system of FIG. 3 promoting and demoting key-value pairs between key-value cache system 140 of FIG. 1, key-value store 320 of FIG. 3, and backend database 125 of FIG. 1. In FIG. 6, key pair 605 including key 610 and value 615 may be promoted 620 from backend database 125 to key-value store 320. Similarly, key pair 340 may be promoted 625 from key-value store 320 to key-value cache system 140. Alternatively, key pair 305 may be demoted 630 from key-value cache system 140 to key-value store 320, and key pair 340 may be demoted 635 from key-value store 320 to backend database 125.

As discussed above with reference to FIG. 3, multi-level cache manager 355 may set the promotion and demotion policies. For example, multi-level cache manager 355 of FIG. 3 may set a promotion policy to promote a key pair from one level of the multi-level cache to a higher level when a key pair has been accessed some threshold number of times in some time span. Multi-level cache manager 355 of FIG. 3 may also set a demotion policy to demote a key pair from one level of the multi-level cache to another when a key pair is not accessed within some threshold amount of time. Alternatively, multi-level cache manager 355 of FIG. 3 may set demotion policies based on criteria to remove key pairs when a level of the cache is full, but a new key pair is needed in the cache. For example, multi-level cache manager 355 of FIG. 3 may set a demotion policy based on a Least Recently Used (LRU) or Least Frequently Used (LFU) policy.

Figure 7:
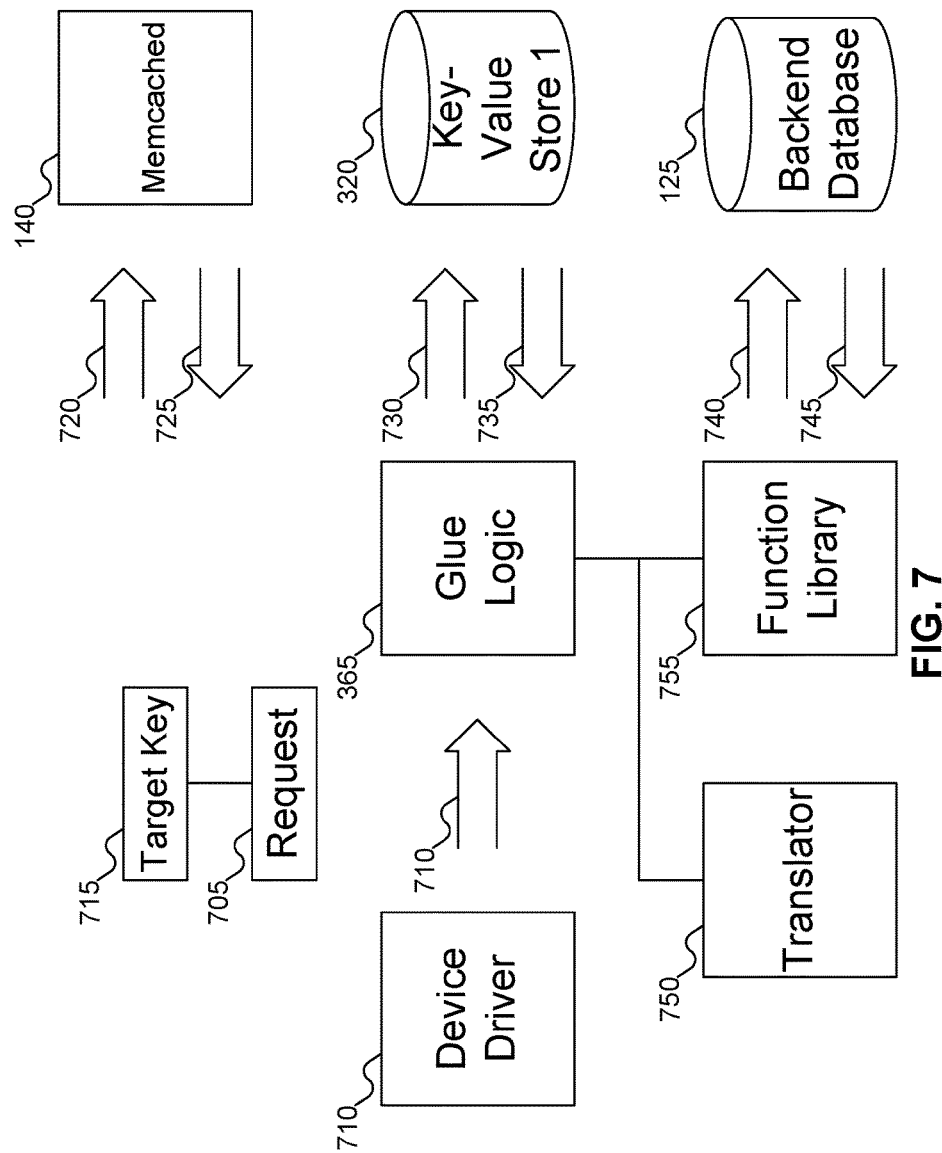
FIG. 7 shows the glue logic of FIG. 3 processing a request for the target value associated with a target key in the multi-level cache system of FIG. 3.

FIG. 7 shows glue logic 365 of FIG. 3 processing a request for the target value associated with a target key in the multi-level cache system of FIG. 3. In FIG. 7, glue logic 365 may receive request 705 from device driver 710. Request 705 may include target key 715, which may represent a key for which an application wants the associated value. Glue logic 365 may pass request 705 to key-value cache system 140, key-value store 320, and backend database 125 in turn, until target key 715 is found in a key pair. More particularly, glue logic 365 may forward request 705 as request 720 to key-value cache system 140, and receive back response 725. If response 725 indicates that target key 715 was not found in a key pair in key-value cache system 140, glue logic 365 may forward request 705 as request 730 to key-value store 320, and receive back response 735. If response 735 indicates that target key 715 was not found in a key pair in key-value store 320, glue logic 365 may then forward request 705 as request 740 to backend database 125, and receive back response 745. Of course, if target key 715 was found in either key-value cache system 140 or key-value store 320, then response 725 or 735 may return the target value, and glue logic 365 would not need to send requests to any further levels of the multi-level cache system.

As described below with reference to FIG. 8, rather than using more conventional interfaces, such as a block-device interface or a file system interface, SSDs 130 and 135 of FIG. 1 may use a key-value interface. That is, when accessing information from key-value store 320, a request may include the key, rather than the address where information is located on the SSD. Glue logic 365 may include translator 750 to translate request 705 into a syntax appropriate for key-value store 320. Glue logic 365 may also include library of functions 755 which may be used to access key-value store 320.

While FIG. 7 shows one embodiment of the inventive concept, other embodiments of the inventive concept are also possible. In another embodiment of the inventive concept, request 705 may be sent to key-value cache system 140 first, and key-value cache system 140 may send request 705 to glue logic 365 (and thence to key-value store 320) if key-value cache system 140 cannot provide the target value. In yet another embodiment of the inventive concept translator 750 may be omitted, leaving SSDs 130 and 135 to receive a file system or block device request and translate accordingly. Other embodiments of the inventive concept are also possible.

Figure 8:
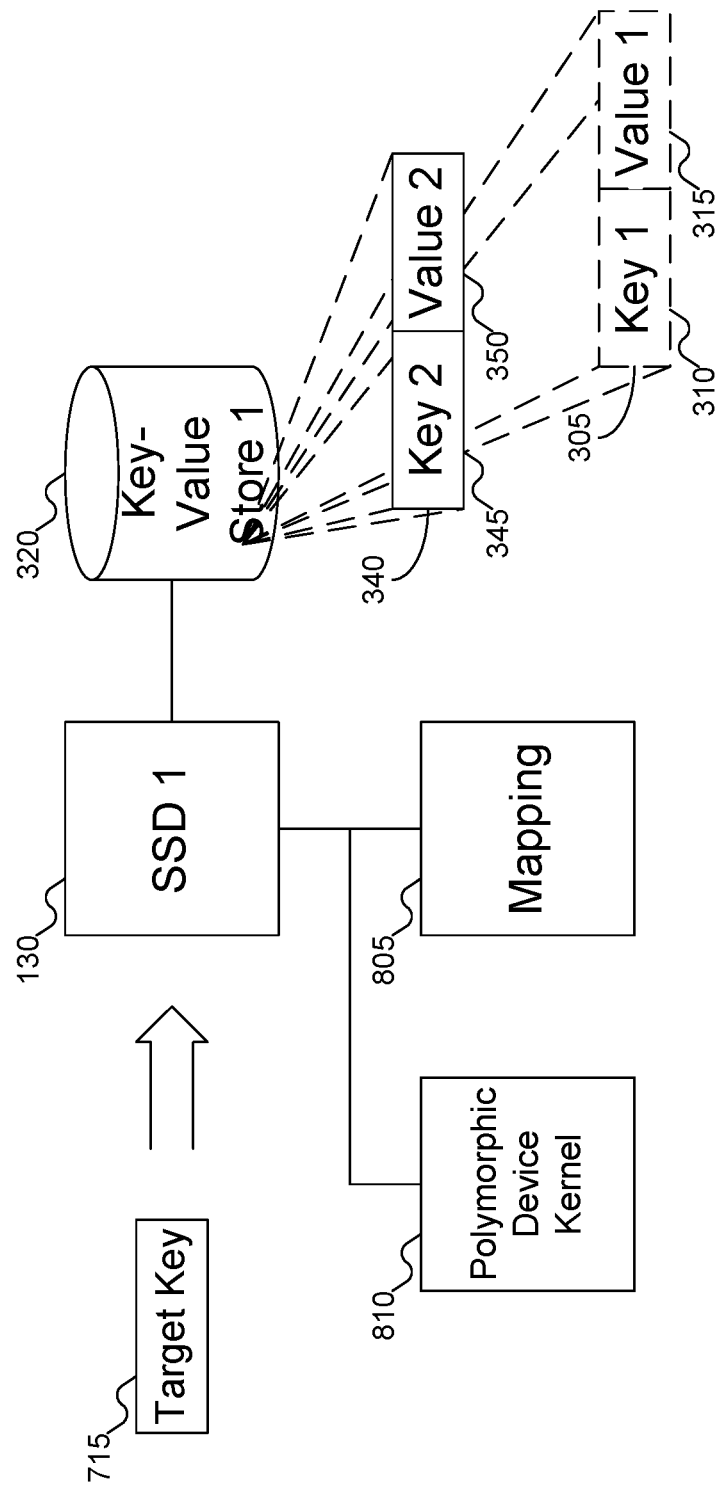
FIG. 8 shows details of the SSDs of FIG. 1.

FIG. 8 shows details of the SSDs of FIG. 1. In FIG. 8, SSD 130 may receive requests using the key-value interface. Thus, FIG. 8 shows SSD 130 receiving target key 715. SSD 130 may use mapping 805 to map target key 715 to an address on SSD 130, which corresponds to where the target address may be found. Mapping 805 may be implemented in any desired manner. For example, mapping 805 may perform a hash function on target value 715 to generate an address where the target value may be located. Or, mapping 805 may include some form of lookup table that maps target value 715 to an address on SSD 130. Yet another example of how mapping 805 may be implemented is described in co-pending U.S. patent application Ser. No. 15/061,873, filed Mar. 4, 2016. Other mappings are also possible.

SSD 130 may also be implemented as a polymorphic SSD. Polymorphic SSDs may be reconfigured to provide different functionality. Examples of different functions that an SSD may provide include In-Storage Computing (ISC) devices, key-value stores, Hadoop® Distributed File System (HDFS) devices, object store devices, and others. (Hadoop is a registered trademark of The Apache Software Foundation in the U.S. and other countries.) By changing the firmware in SSD 130, SSD 130 may be reconfigured to operate differently. It is also possible for SSD 130 to support multiple functionalities simultaneously for different logical areas of SSD 130 (much like hard disk drives may be partitioned into different logical disks), with SSD 130 mapping a particular request to the appropriate logical area and processing the request accordingly. To support polymorphism, SSD 130 may include polymorphic device kernel 810. An example of how polymorphism may be implemented in SSD 130 is described in co-pending U.S. Provisional Patent Application Ser. No. 62/290,295, filed Feb. 2, 2016.

In FIG. 8, key-value store 320 is shown as including both key pairs 305 and 340, whereas in FIG. 3 key-value store 320 was shown as including only key pair 340 (key pair 340 being included in key-value cache system 140 of FIG. 3). These contrasting figures show that the multi-level cache system may support both inclusive and exclusive inclusion policies. In brief, a multi-level cache system is "inclusive" when more than one level (ignoring backend database 125 of FIG. 1) of the multi-level cache system includes the same key pair (such as key pair 305); if no more than one level of the multi-level cache system (aside from backend database 125 of FIG. 1) includes any given key pair, then the multi-level cache system is said to be "exclusive". Note that in an inclusive multi-level cache system, it is not required that every level of a cache store a particular key pair. For example, a key pair might have been promoted to key-value store 320 without having been promoted to key-value cache system 140 of FIG. 1, or a key pair that was stored in both key-value cache system 140 of FIG. 1 and key-value store 320 might have been evicted from key-value store 320 while still being resident in key-value cache system 140 of FIG. 1. An inclusive multi-level cache system permits key pair redundancy (i.e., more than one level of cache storing the same key-value pair), but does not require such redundancy.

Figure 9:
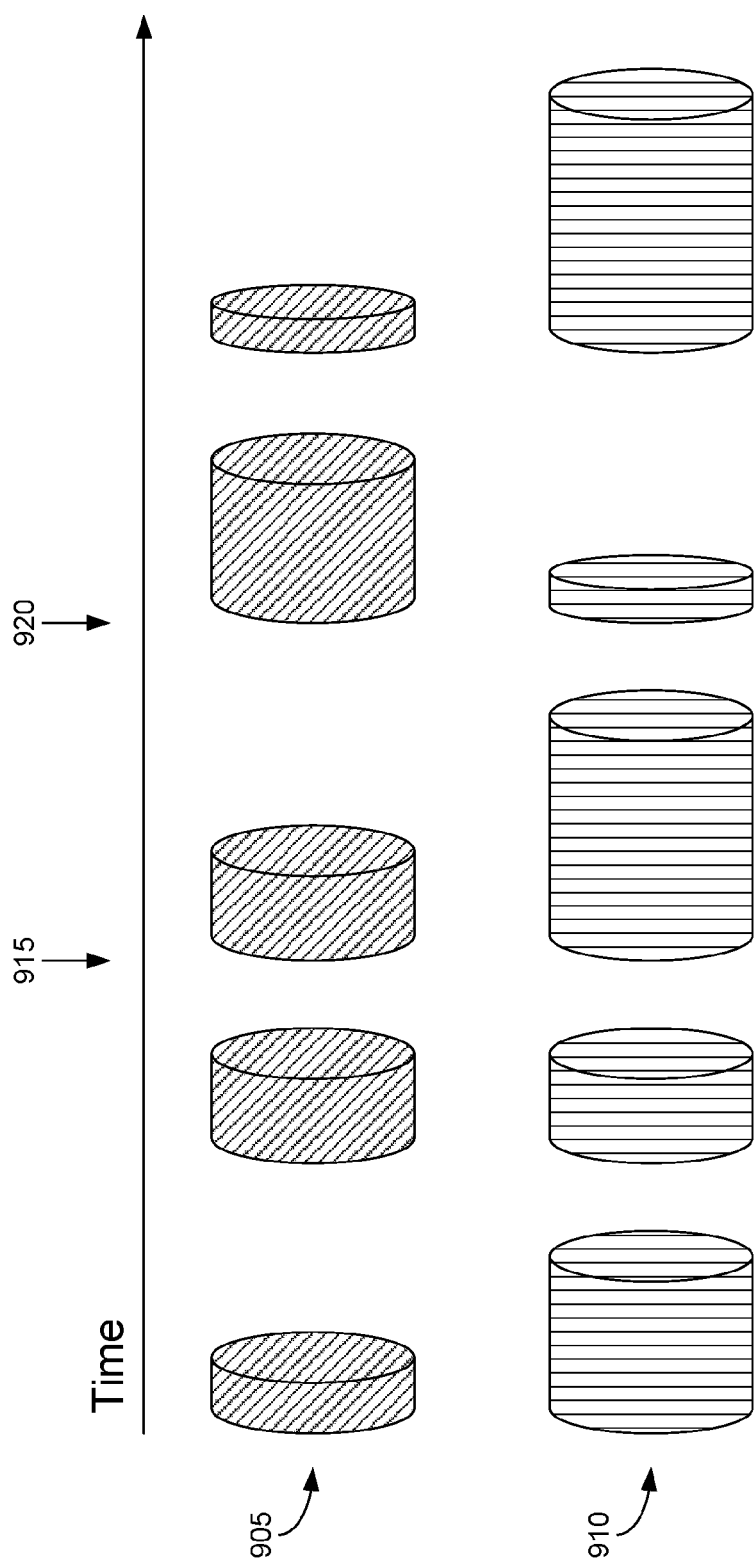
FIG. 9 shows an example the requirements of the key-value cache system and the key-value store of the multi-level cache system of FIG. 3 for a namespace, varying over time.

FIG. 9 shows an example of the requirements of key-value cache system 140 of FIG. 1 and key-value store 320 of FIG. 3 of the multi-level cache system of FIG. 3 for a namespace, varying over time. In FIG. 9, time is shown proceeding from left to right, and rows 905 and 910 represent the amount of memory and key-value store space required at various points of time, respectively. Although the space requirements may vary in a continuous manner, for simplicity FIG. 9 shows these requirements at discrete points of time. Note that in rows 905 and 910 there is no required correlation between the requirements of memory space and key-value store space. For example, at time 915, the required memory is relatively low, whereas the required key-value store space is relatively high; in contrast, this relationship is inverted at time 920. At other times, the required memory and key-value store space might both be low or high.

Figure 10:
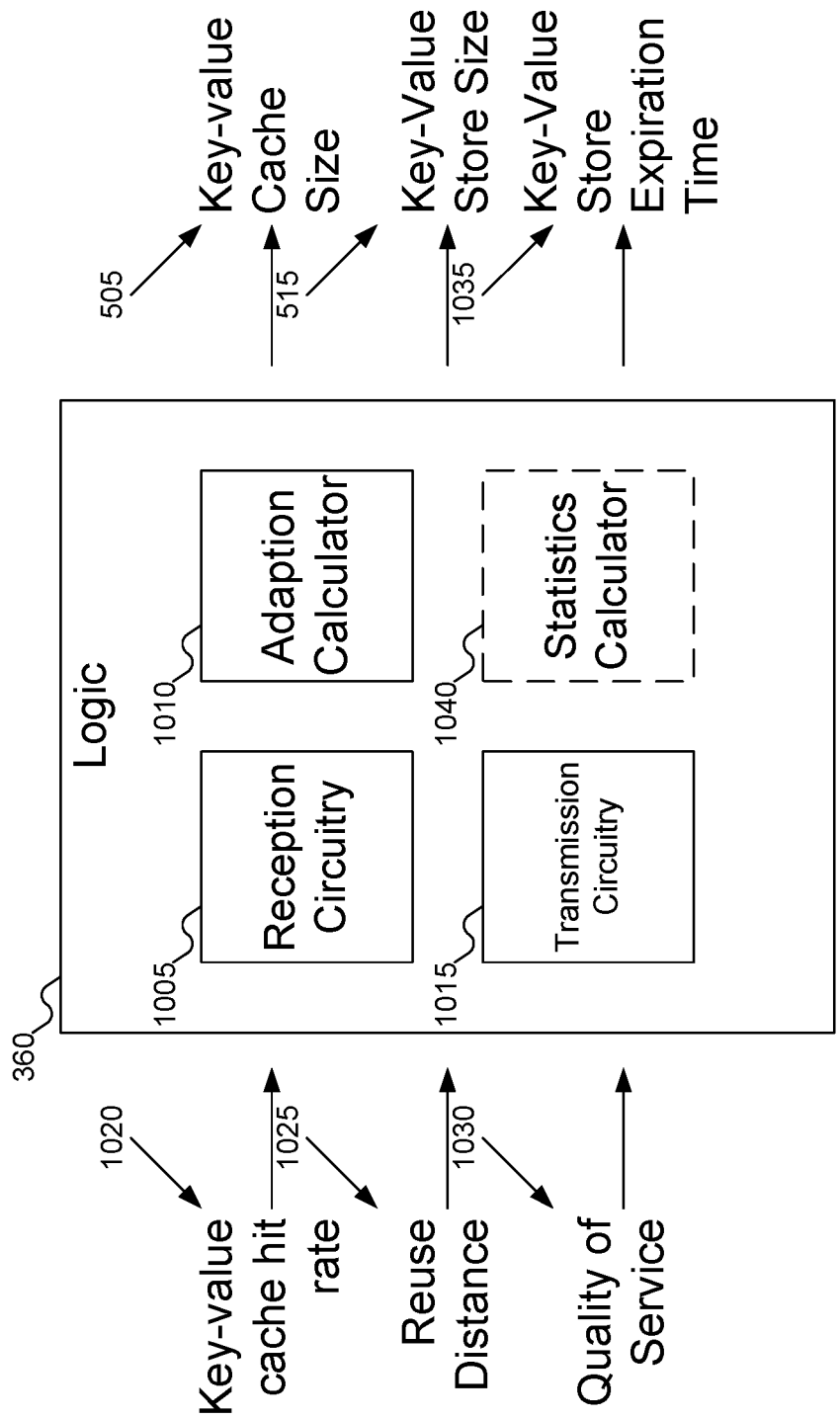
FIG. 10 shows details of the logic of FIG. 3 for calculating the capacities of the key-value cache system and the key-value store of the multi-level cache system of FIG. 3, according to an embodiment of the inventive concept.

FIG. 10 shows details of logic 360 of FIG. 3 for calculating the capacities of key-value cache system 140 of FIG. 1 and key-value store 320 of FIG. 3 of the multi-level cache system of FIG. 3, according to an embodiment of the inventive concept. In FIG. 10, logic 360 may include reception circuitry 1005, adaption calculation 1010, and transmission circuitry 1015. Reception circuitry 1005 and transmission circuitry 1015 may receive information at and transmit information from, respectively, logic 360. Adaption calculator 1010 may calculate "optimal" sizes for key-value cache system 140 of FIG. 1 and key-value store 320 of FIG. 3 based on the received information.

Reception circuitry 1005 may receive, among other data, database cache hit rate 1020 and reuse distance 1025. Key-value cache hit rate 1020 may be an indication of how often a target key may be found in key-value cache system 140 of FIG. 1 relative to how often a target key is requested. While key-value cache hit rate 1020 may be represented as a percentage of how many cache hits occur relative to the total number of queries, key-value cache hit rate 1020 may be represented in other formats: for example, as a ratio of the number of cache misses relative to the number of cache hits (in which case a value of zero would be considered ideal). Key-value cache hit rate 1020 may be calculated based solely on key-value cache system 140 of FIG. 1 within server 105 of FIG. 1, or based on all key-value cache systems 140 across a distributed database system.

Reuse distance 1025 may be an indication of how frequently a particular datum is accessed from a cache. More specifically, the reuse distance is the number of distinct data accesses that have occurred between two accesses of the same datum.

As an example of reuse distance, consider the following data access pattern (ordered from left to right):

| | Address | | | | | | | |
|---|---|---|---|---|---|---|---|---|
| | A | B | C | A | B | B | A | C |
| Distance | ∞ | ∞ | ∞ | 2 | 2 | 0 | 1 | 2 |

The first three data accesses have an infinite reuse distance, since those data have not been accessed before. The reuse distance for the second access of datum A is 2, because data B and C were accessed in between the two accesses to datum A. Similarly, the reuse distance for the second access of datum B is 2, because data C and A were accessed in between the two accesses to datum B. The reuse distance for the third access of datum B is 0, because datum B was the immediately previously accessed datum. The reuse distance for the third data access of datum A is 1, because only datum B was accessed between the second and third accesses of datum A (the fact that datum B was accessed twice in that span is not relevant). Finally, the reuse distance for the second access of datum C is 2, because data A and B were each accessed between the two accesses of datum C (again, the fact that data A and B were each accessed twice in that span is not relevant). As may be seen from this example, reuse distance for a particular datum is a number; but reuse distance considering all data over time involves a vector, since the reuse distance may be different for different data, and even for the same data at different times. Some embodiments of the inventive concept may utilize reuse distance 1025 for only the last access of each datum; other embodiments of the inventive concept may utilize reuse distance 1025 for all accesses of each datum over time; still other embodiments of the inventive concept may select the largest value from a reuse distance vector as reuse distance 1025 (thereby using a number, rather than a vector, as reuse distance 1025). Reuse distance 1025 may be tracked within key-value store 320 of FIG. 3, or it may be calculated from other cache information, such as LRU information for key-value store 320.

Whereas key-value cache hit rate 1020 may be calculated for key-value cache system 140 of FIG. 1, reuse distance 1025 may be calculated for key-value store 320 of FIG. 3. Typically, key-value cache hit rate 1020 is fairly consistent across all servers in a distributed database system, but reuse distance 1025 may vary depending on the server in question. Thus in embodiments of the inventive concept reuse distance 1025 may be calculated based on key-value store 320 of FIG. 3 in server 105 of FIG. 1; other embodiments of the inventive concept may calculate reuse distance 1025 based on all key-value stores on server 105, or an all key-value stores across the distributed database system.

Reception circuitry 1005 may also receive user-selected quality of server 1030. User-selected quality of service 1030 may specify a particular quality of service that user desires to improve. Example qualities of service that the user might desire to improve include the average latency of the system—that is, how long it takes, on average, for a reply to be generated for a query—or the overall cost of the distributed database system.

Each component of the distributed database system—key-value cache system 140 of FIG. 1, key-value store 320 of FIG. 3, and storage device 120 of FIG. 1—has a cost and a latency. As described above, memory 115 of FIG. 1 is typically the fastest to access, but has a high cost. SSDs 130 and 135 of FIG. 1 are typically slower to access than memory 115 of FIG. 1, but cost significantly less. Storage device 120 of FIG. 1 often has higher storage capacity than SSDs 130 and 135 of FIG. 1, but are usually significantly slower to access than either memory 115 of FIG. 1 or SSDs 130 and 135 of FIG. 1. Typically, the more one tries to reduce latency, the higher the cost of the overall system. (For example, most people would consider an ideal system to be one with near zero latency and no cost. Aside from no such system currently existing, the description is unrealistic.) Thus, minimizing latency and cost are usually competing objectives that cannot both be completely satisfied.

In a multi-level cache system such as in embodiments of the inventive concept, the average latency may be calculated by summing the latency of each device multiplied by the likelihood of needing to access that device. Assume that i identifies the ith level of the multi-level cache system, numbered in the order that the caches are accessed for a target key. Thus, in the example multi-level cache system of FIG. 3, the multi-level cache system includes two levels: level 1 is memory 115 of FIG. 1, and level 2 is SSD 135 of FIG. 1. Let $H_i$ and $L_i$ represent the hit rate and the latency for a particular level of the multi-level cache system, respectively. Finally, let $L_{DB}$ represent the latency of backend database 125 of FIG. 1 (more accurately, the latency of storage device 120 of FIG. 1 which stores backend database 125 of FIG. 1). If the multi-level cache system only includes two cache levels in addition to backend database 125 of FIG. 1, then the average latency of the multi-level cache system may be calculated as $L_{avg}=H_1 \times L_1+(1-H_1) \times H_2 \times L_2+(1-H_1) \times (1-H_2) \times L_3$. This may be expressed linguistically as the likelihood that the target key will be found in key-value cache system 140 of FIG. 1 multiplied by the latency of memory 115 of FIG. 1, plus the likelihood that the target key was not found in key-value cache system 140 of FIG. 1 multiplied by the likelihood that the target key will be found in key-value store 320 of FIG. 3 multiplied by the latency of SSD 130 of FIG. 1, plus the likelihood that the target key was not found in either key-value cache system 140 of FIG. 1 or key-value store 320 of FIG. 3 multiplied by the latency of storage device 120 of FIG. 1.

More generally, in a multi-level cache system with n total cache levels (not including storage device 120 of FIG. 1), the average latency may be calculated as $$L_{avg} = \sum_{i=1}^{n} \left( \left( H_i \times \prod_{j=1}^{i-1} (1-H_j) \right) \times L_i \right) + \prod_{i=1}^{n} ((1-H_i) \times L_{DB}).$$

In a multi-level cache system such as in embodiments of the inventive concept, the total cost of ownership may be calculated (generally) by multiplying the cost of the hardware for a particular level multiplied by the number of units at that level. Expressed in an equation, if $UC_i$ and $Cap_i$ represent the unit cost and capacity at the ith level of the multi-level cache system, and $UC_{DB}$ and $Cap_{DB}$ represent the unit cost and capacity of storage device 120 of FIG. 1, then the total cost of ownership may be calculated as $$TCO = \sum_{i=1}^{n} (UC_i \times Cap_i) + (UC_{DB} \times Cap_{DB}).$$

Note that this calculation for total cost of ownership is an estimate, as different units purchased at different times typically have different unit costs, and the equation does not consider the cost of electricity needed to power the various components. But this equation may be modified to account for these variations, if desired. Thus the equations shown above are merely exemplary: other embodiments of the inventive concept may utilize other equations.

Given equations that define the latency and cost of the multi-level cache system, and given key-value cache hit rate 1020, reuse distance 1025, and user-selected quality of service 1030, adaption calculator 1010 may calculate the "optimal" sizes for key-value cache system 140 of FIG. 1 and key-value store 320 of FIG. 3. Note that what is considered "optimal" depends on the user-selected quality of service. For example, if the user desires a latency of one millisecond, the respective sizes of key-value cache system 140 of FIG. 1 and key-value store 320 of FIG. 3 will likely be different than the respective sizes for a system with a desired latency of 0.5 milliseconds: the faster latency requirement will likely require considerably more memory 115 of FIG. 1 to achieve, increasing the overall cost of the multi-level cache system. Or if the user desires to optimize cost, the system will likely have far more storage in key-value store 320 of FIG. 3 than in key-value cache system 140 of FIG. 1, due to the reduced cost of SSDs 130 and 135 of FIG. 1 vs. memory 115 of FIG. 1.

Adaption calculator 1010 may "optimize" the sizes of key-value cache system 140 of FIG. 1 and key-value store 320 of FIG. 3 in different ways, depending on the embodiment of the inventive concept. In some embodiments of the inventive concept, adaption calculator 1010 may calculate a curve comparing reuse distance 1025 with a reference count.

A "reference count" typically represents the number of times a particular address or key is accessed. But when adaption calculator 1010 calculates the above-described curve, the curve plots reuse distances vs. the number of addresses or keys with that particular reuse distance. Once adaption calculator 1010 has generated the curve, adaption calculator may use integral calculus to calculate the area under the curve, to determine the "optimal" size for key-value cache system 140 of FIG. 1 and key-value store 320 of FIG. 3. In other embodiments of the inventive concept, adaption calculator 1010 may use linear programming techniques to move stepwise to an "optimal" solution. In yet other embodiments of the inventive concept, adaption calculator 1010 may make small changes in the proposed sizes for key-value cache system 140 of FIG. 1 and key-value store 320 of FIG. 3 to see if the resulting system achieves (or moves towards) the desired user-selected quality of service. In yet other embodiments of the inventive concept, adaption calculator 1010 may use machine learning techniques to optimize sizes for key-value cache system 140 of FIG. 1 and key-value store 320 of FIG. 3. Yet other approaches to calculating the target sizes for key-value cache system 140 of FIG. 1 and key-value store 320 of FIG. 3 are also possible.

For example, consider a scenario where the average latency of the multi-level cache system is 1.1 milliseconds. The user may select a desired quality of service of 1.0 milliseconds. To reduce the average latency of the multi-level cache system, memory 115 of FIG. 1 could be increased by some amount, as memory has the lowest latency and therefore likely the overall greatest impact on calculated latency. But it might be that key-value store 320 of FIG. 3 is very small, and increasing the size of key-value store 320 of FIG. 3 might improve the average latency of the multi-level cache system. Since the cost of increasing the size of key-value store 320 of FIG. 3 is likely less than the cost of adding addition memory 115 of FIG. 1, increasing the size of key-value store 320 of FIG. 3 might provide the "optimal" solution.

After adaption calculator 1010 has performed its function, adaption calculator may output target key-value cache size 505 and target key-value store size 515. These values may be transmitted by transmission circuitry 1015 to the appropriate components in server 105 of FIG. 1 (or in another server, if logic 360 is performing its calculations for equipment located on another server within the distributed database system). The appropriate components may then use target key-value cache size 505 and target key-value store size 515 to adjust the sizes of key-value cache system 140 of FIG. 1 and key-value store 320 of FIG. 3 accordingly.

Adaption calculator 1010 may also calculate key-value store expiration time 1035. If key-value store 1035 is large, it might happen that some key-value pairs remain in key-value store 320 of FIG. 3 for longer than they should, despite the demotion policy that might apply to the multi-level cache system. While the existence of these key-value pairs in key-value store 320 of FIG. 3 does not necessarily hurt (although their presence might take up space that could otherwise be allocated to a key-value store for another namespace), if the key-value pairs are not needed, they may be removed from key-value store 320 with a negligible impact on latency.

Adaption calculator 1010 may check to see if there are key-value pairs that are staying resident in key-value store 320 of FIG. 3 too long in a number of ways. In some embodiments of the inventive concept, adaption calculator 1010 may check to see if reuse distance 1025 for some target data is routinely higher than some threshold: if so, then the target data is part of a key-value pair that may be expired. In other embodiments of the inventive concept, adaption calculator 1010 may look to see how long it has been since various data have been accessed: again, if it has been longer than some threshold, then the target data may be expired. Adaption calculator may then set key-value store expiration time 1035 to force these and other key-value pairs to be expired from key-value store 320 of FIG. 10 if they have remained present in key-value store 320 of FIG. 3 too long. For example, key-value store expiration time 1035 might be set to one second to force any key-value pairs that have not been accessed within the last second to be expired from key-value store 320 of FIG. 3.

While FIG. 10 shows reception circuitry 1005 as receiving key-value cache hit rate 1020 and reuse distance 1025, other embodiments of the inventive concept are also possible. For example, reception circuitry may receive the underlying data used to calculate key-value cache hit rate 1020 and reuse distance 1025, and statistics calculator 1040 may then calculate these statistics from the underlying data. Other embodiments of the inventive concept may mix the two concepts: for example, reception circuitry 1005 might receive key-value cache hit rate 1020 and the LRU information for the key-value store, and statistics calculator 1040 might only calculate reuse distance 1025. Because some embodiments of the inventive concept might not include statistics calculator 1040, statistics calculator 1040 is shown with dashed lines.

Where there is only one namespace using key-value cache 140 of FIG. 1, the operation of adaption calculator 1010 is relatively straightforward: at worst, adaption calculator is solving equations with multiple variables, with overall solutions being relatively simple. For example, user-selected quality of service 1030 is a particular latency value, the best solution the system may offer is to allocate all available memory in key-value cache 140 of FIG. 1 to the namespace, then all available storage in key-value store 320 of FIG. 3. If that combination does not provide a sufficient query speed, the system will require additional memory.

But where the system supports more than one namespace, things get more complicated. For example, if the system allocates all available memory in key-value cache 140 of FIG. 1 to one namespace, it is likely that the latency of a second namespace will be inadequate. (This conclusion also ignores the fact that the first namespace will likely have more memory of key-value cache 140 of FIG. 1 allocated to it than it needs to satisfy the user-selected latency.) Thus, when multiple namespaces are involved, the system may need to balance the requirements of namespaces against each other.

To address the requirements of simultaneous namespaces, adaption calculator 1010 can attempt to optimize multiple equations at the same time. For example, adaption calculator 1010 can use linear programming techniques to solve multiple equations with multiple variables. Or, adaption calculator 1010 can use integral calculus to determine the space (in two or more dimensions) under a multi-dimension curve. Or, adaption calculator 1010 can use machine learning techniques to optimize multiple namespaces at the same time.

Each namespace may specify its own system requirements, such as overall cost that may be allocated to the namespace, and desired latency for the namespace. Each namespace may also specify a weight, enabling adaption calculator 1010 to determine the relative importance of the various namespaces.

A multi-level cache system can be shared/partitioned using weights (see, e.g., Choi, Inseok Stephen, Greedy Coordinate Descent CMP Multi-Level Cache Resizing (2014), which is incorporated by reference herein). Power efficiency gains (PEG) or Utility may be recalculated based on such provided weights so that the algorithm may decide the allocation of each caching-level capacity.

Adaption calculator 1010 may then determine the amount of memory in key-value cache system 140 Dynamic RAM and the amount of space in key-value stores 320, 325, 330, and/or 335 to allocate to each namespace, as described above, to attempt to optimize the multi-level cache system for all namespaces. If there is a conflict of resources—that is, not all namespace requirements may be satisfied simultaneously, adaption calculator 1010 may use the weights to prioritize which namespaces requirements are to be satisfied first (thereby attempting to at least provide the desired Qualities of Service for the namespaces in their relative order of importance). And if namespace requirements change over time, adaption calculator 1010 may recalculate the allocation of the levels of the multi-level cache system accordingly.

Figure 11:
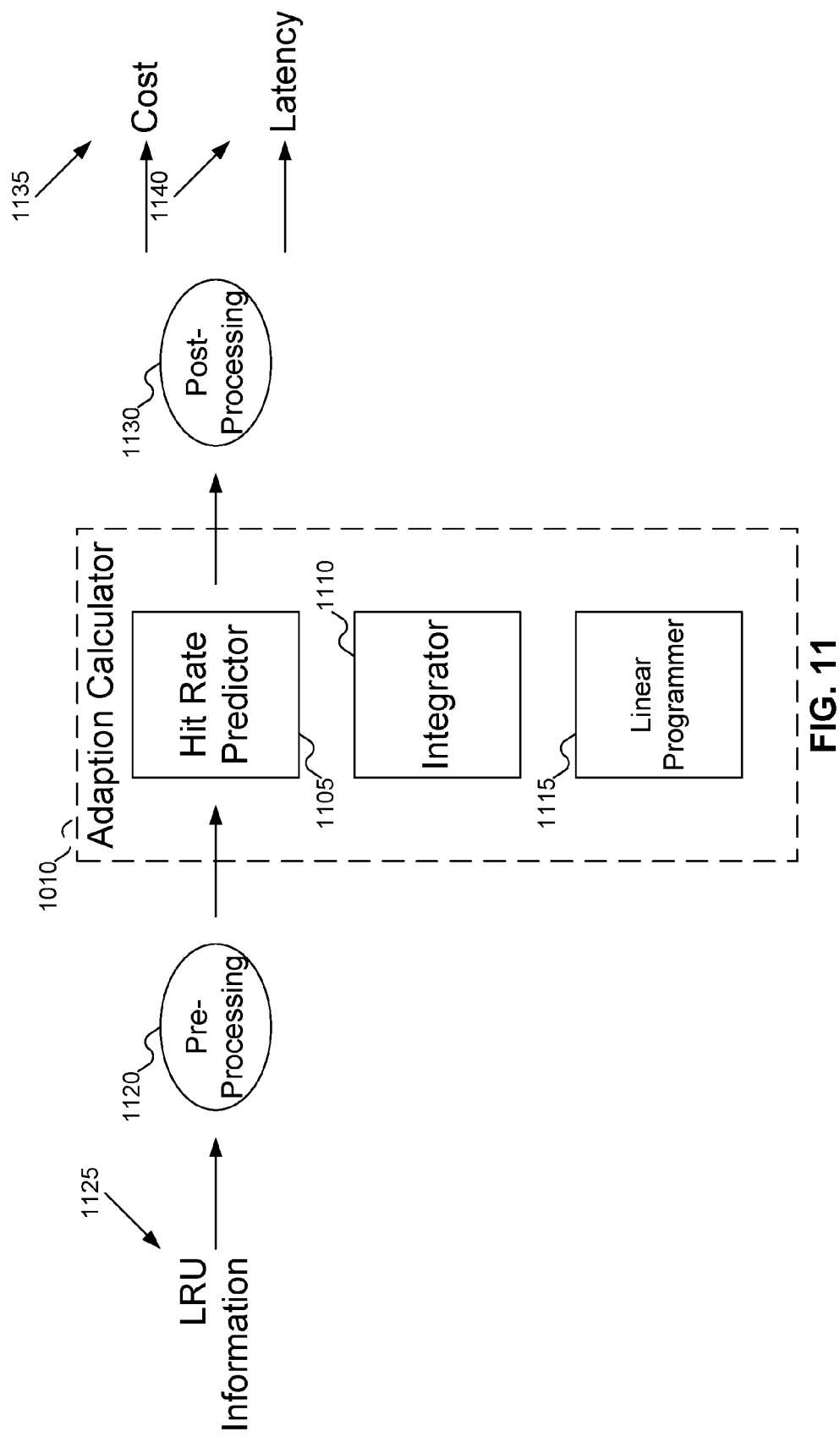
FIG. 11 shows the use of a hit rate predictor in calculating the capacities of the key-value cache system and the key-value store of the multi-level cache system of FIG. 3, according to an embodiment of the inventive concept.

FIG. 11 shows the use of a hit rate predictor in calculating the capacities of the key-value cache system and the key-value store of the multi-level cache system of FIG. 3, according to an embodiment of the inventive concept. In FIG. 11, hit-rate predictor 1105 may be part of adaption calculator 1010. (Adaption calculator 1010 may also include other components, such as integrator 1110 to calculate the area under a curve, or linear programmer 1115 to "optimize" user-selected quality of service 1030 of FIG. 10, to perform other calculations as described above). Hit rate predictor 1105 may take key-value cache hit rate 1020 of FIG. 10 and reuse distance 1025 of FIG. 10, along with a proposed size for key-value cache system 140 of FIG. 1, and predict what the hit rate would be for key-value cache system 140 of FIG. 1. Adaption calculator 1010 may vary the proposed size for key-value cache system 140 and see how the multi-level cache system would perform with different sizes for key-value cache system 140. This information, combined with user-selected quality of service 1030 of FIG. 10, may be used to select the "optimal" size for key-value cache system 140 of FIG. 1.

As mentioned above, reuse distance 1025 of FIG. 10 may be calculated from the LRU information for key-value store 320 of FIG. 3. Pre-processing 1120 may take LRU information 1125 and generate reuse distance 1025 of FIG. 10 for use by adaption calculator 1010.

Post-processing 1130 may take the information generated by adaption calculator 1010 (specifically, the target sizes for key-value cache system 140 of FIG. 1 and key-value store 320 of FIG. 3) and calculate cost 1135 and latency 1140 for the proposed multi-level cache system. Post-processing 1130 simply needs to apply the equations used by adaption calculator 1010 to "optimize" the multi-level cache system, given the new sizes for key-value cache system 140 of FIG. 1 and key-value store 320 of FIG. 3.

Figure 12:
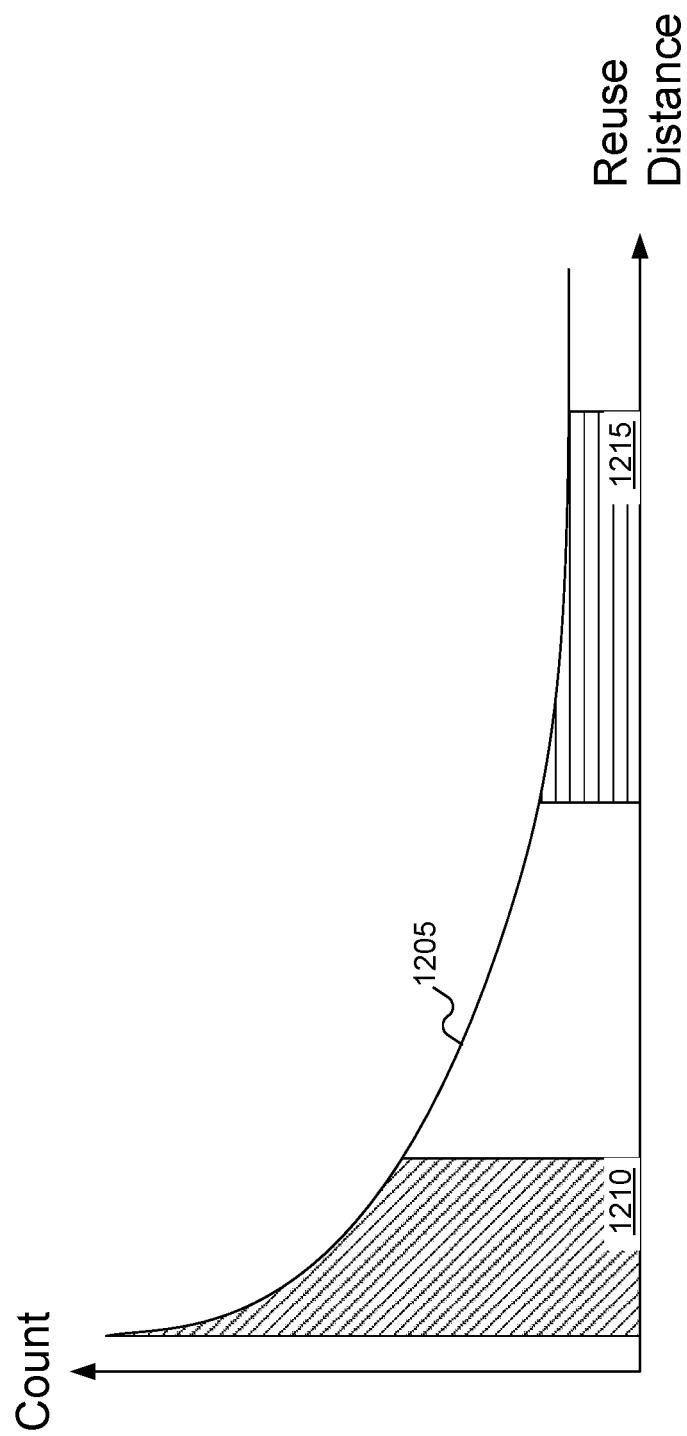
FIG. 12 shows a graph of the number of key-value pairs in the key-value cache system vs. the reuse distance of the key-value store, in calculating the capacities of the key-value cache system and the key-value store of the multi-level cache system of FIG. 3.

FIG. 12 shows an example graph of the number of key-value pairs in key-value cache system 140 of FIG. 1 vs. reuse distance 1025 of FIG. 10 of key-value store 320 of FIG. 3, in calculating the capacities of key-value cache system 140 of FIG. 1 and key-value store 320 of FIG. 3 of the multi-level cache system. In FIG. 1, curve 1205 is shown, plotting the number of key-value pairs in key-value cache system 140 of FIG. 1 vs. reuse distance 1025 of FIG. 10. By integrating to calculate the area under curve 1205, adaption calculator 1010 of FIG. 10 may determine how to adjust the allocation of memory 115 of FIG. 1 to key-value cache system 140 of FIG. 1.

Despite the description above and the example shown in FIG. 12, in fact there are two variables in the equations. One is the capacity of the level of the multi-level cache system, be it key-value cache system 140 of FIG. 1 or the key-value store 320 of FIG. 3. The other is reuse distance 1025 of FIG. 10 or database cache hit rate 1020 of FIG. 10. Either of these variables can be solved for the other, depending on the intended objective. For example, treating reuse distance 1025 or FIG. 10 or database cache hit rate 1020 of FIG. 10 as the variable, integrating the area under curve 1205 can attempt to calculate an optimal capacity for the level. Alternatively, treating the capacity as the variable, reuse distance 1025 of FIG. 10 or database cache hit rate 1020 of FIG. 10 can be optimized.

Adaption calculator 1010 of FIG. 10 may integrate area 1210 under the left side of curve 1205. Area 1210 under the left side of curve 1205 may determine how much memory 115 of FIG. 1 should be allocated to key-value cache system 140. Alternatively, adaption calculator 1010 of FIG. 35 may integrate area 1215 under the right side of curve 1215. Area 1215 under the right side of curve 1205 may determine how much excess capacity of memory 115 of FIG. 1 has been allocated to key-value cache system 140 of FIG. 1.

While the above description focuses on calculating the amount of memory 115 of FIG. 1 to be allocated to key-value cache system 140 of FIG. 1, the same analysis may be applied to determine the amount of storage in SSD 130 of FIG. 1 to allocate to key-value store 320 of FIG. 3. The only difference is that instead of plotting the correlation between the number of key-value pairs in key-value cache system 140 of FIG. 1 vs. reuse distance 1025 of FIG. 10, curve 1205 may plot the correlation between the number of key-value pairs in key-value store 320 of FIG. 3 vs. reuse distance 1025 of FIG. 10.

Figure 13A:
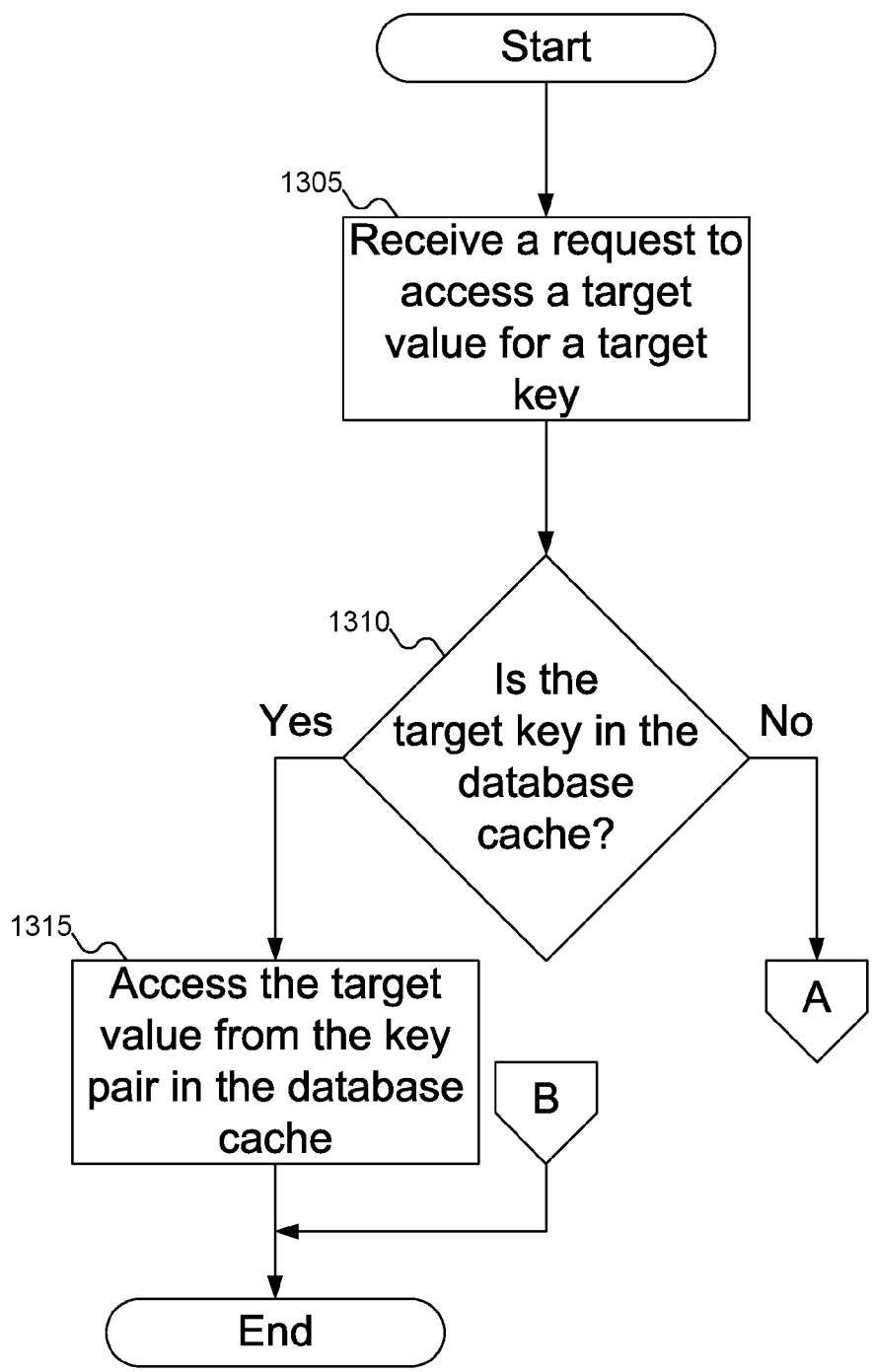
FIGS. 13A-13B show a flowchart of a procedure for the multi-level cache system of FIG. 3 to process a request for a target value associated with a target key, according to an embodiment of the inventive concept.
Figure 13B:
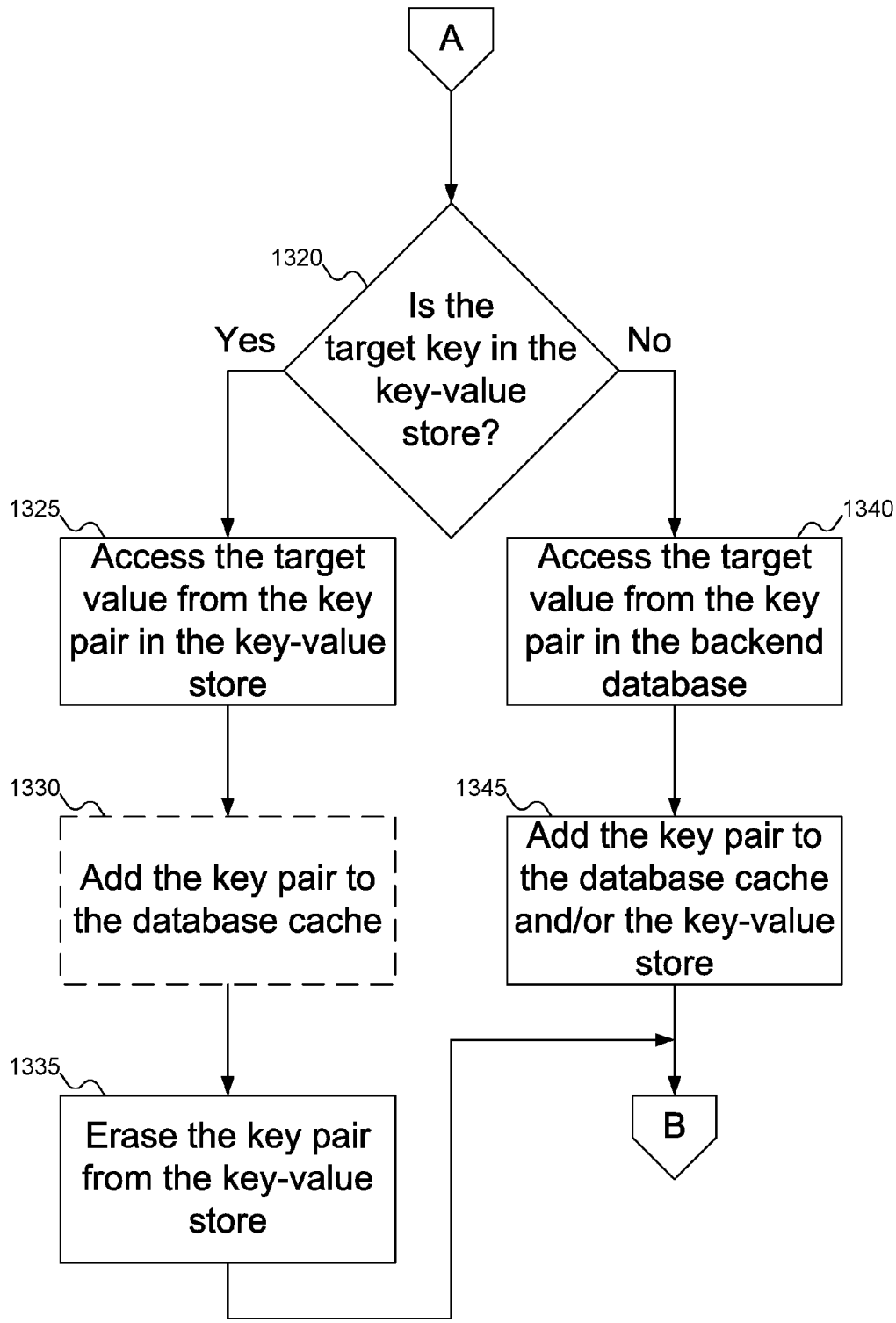

FIGS. 13A-13B show a flowchart of an example procedure for the multi-level cache system of FIG. 3 to process a request for a target value associated with target key 715 of FIG. 7, according to an embodiment of the inventive concept. In FIG. 13A, at block 1305, glue logic 365 of FIG. 3 may receive request 705 of FIG. 7 with target key 715 of FIG. 7. At block 1310, glue logic 365 of FIG. 3 may query key-value cache system 140 of FIG. 1 as to whether target key 715 of FIG. 7 is in key-value cache system 140 of FIG. 1. This may involve forwarding request 720 of FIG. 7 to key-value cache system 140 of FIG. 1, and receiving response 725 of FIG. 7 back. If response 725 of FIG. 7 indicates that target key 715 of FIG. 7 was found in key-value cache system 140 of FIG. 1, then at block 1315 glue logic 365 of FIG. 3 may access the target value from key-value cache system 140 of FIG. 1 (actually, this access would have been done by key-value cache system 140 of FIG. 1 to send affirmative response 725 of FIG. 7).

If key-value cache system 140 of FIG. 1 had sent negative response 725 of FIG. 7 to glue logic 365 of FIG. 3, then at block 1320 (FIG. 13B) glue logic 365 of FIG. 3 may query key-value store 320 of FIG. 3 as to whether target key 715 of FIG. 7 is in key-value store 320 of FIG. 3. This may involve forwarding request 730 of FIG. 7 to key-value store 320 of FIG. 3, and receiving response 735 of FIG. 7 back. If response 735 of FIG. 7 indicates that target key 715 of FIG. 7 was found in key-value store 320 of FIG. 3, then at block 1325 glue logic 365 of FIG. 3 may access the target value from key-value store 320 of FIG. 3 (actually, this access would have been done by key-value store 320 of FIG. 3 to send affirmative response 735 of FIG. 7).

If target key 715 of FIG. 7 was found in key-value store 320 of FIG. 3, then at block 1330, glue logic 365 of FIG. 3 may promote the key-value pair from key-value store 320 of FIG. 3 to key-value cache system 140 of FIG. 1. Block 1330 is shown with a dashed line because its execution may depend on whether the key-value pair qualifies for promotion based on the promotion policy, as described above with reference to FIG. 6. Then, at block 1335, glue logic 365 of FIG. 3 may erase the key-value pair from key-value store 320 of FIG. 3. Of course, block 1335 is only needed if the multi-level cache system is exclusive; if the multi-level cache system is inclusive, then the key-value pair may remain in key-value store 320 of FIG. 3.

On the other hand, if key-value store 320 of FIG. 3 had sent negative response 735 of FIG. 7 to glue logic 365 of FIG. 3, then at block 1340 glue logic 365 of FIG. 3 may access the target value from backend database 125 of FIG. 1. This may involve forwarding request 740 of FIG. 7 to backend database 125 of FIG. 1, and receiving response 745 of FIG. 7 back. Then, at block 1345, glue logic 365 may add the key pair to one or more levels of the multi-level cache, if the key pair qualifies for promotion and based on whether the multi-level cache is inclusive or exclusive.

Figure 14A:
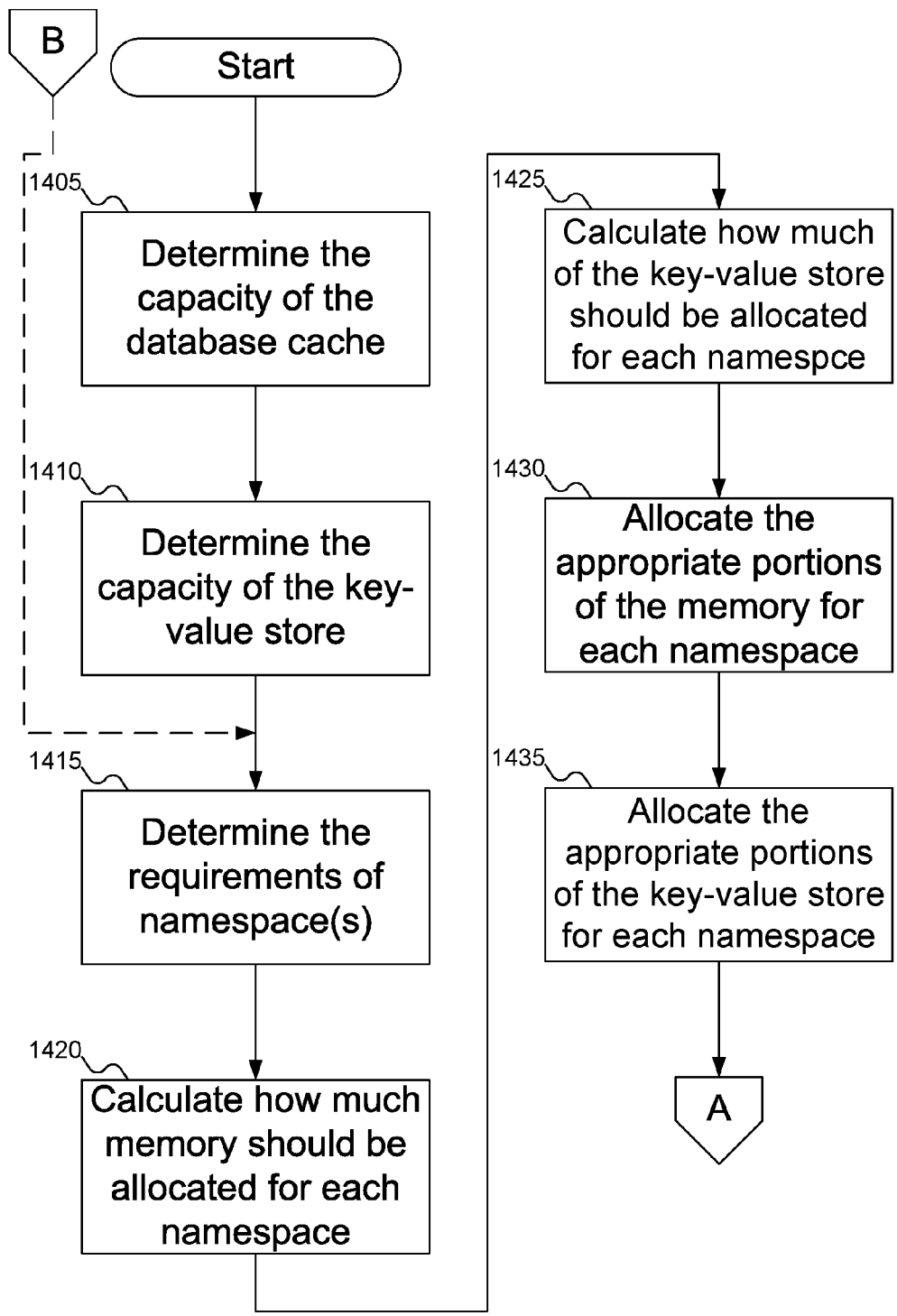
FIGS. 14A-14B show a flowchart of a procedure for the multi-level cache system of FIG. 3 to configure the key-value cache system and the key-value store of the multi-level cache system of FIG. 3, according to an embodiment of the inventive concept.
Figure 14B:
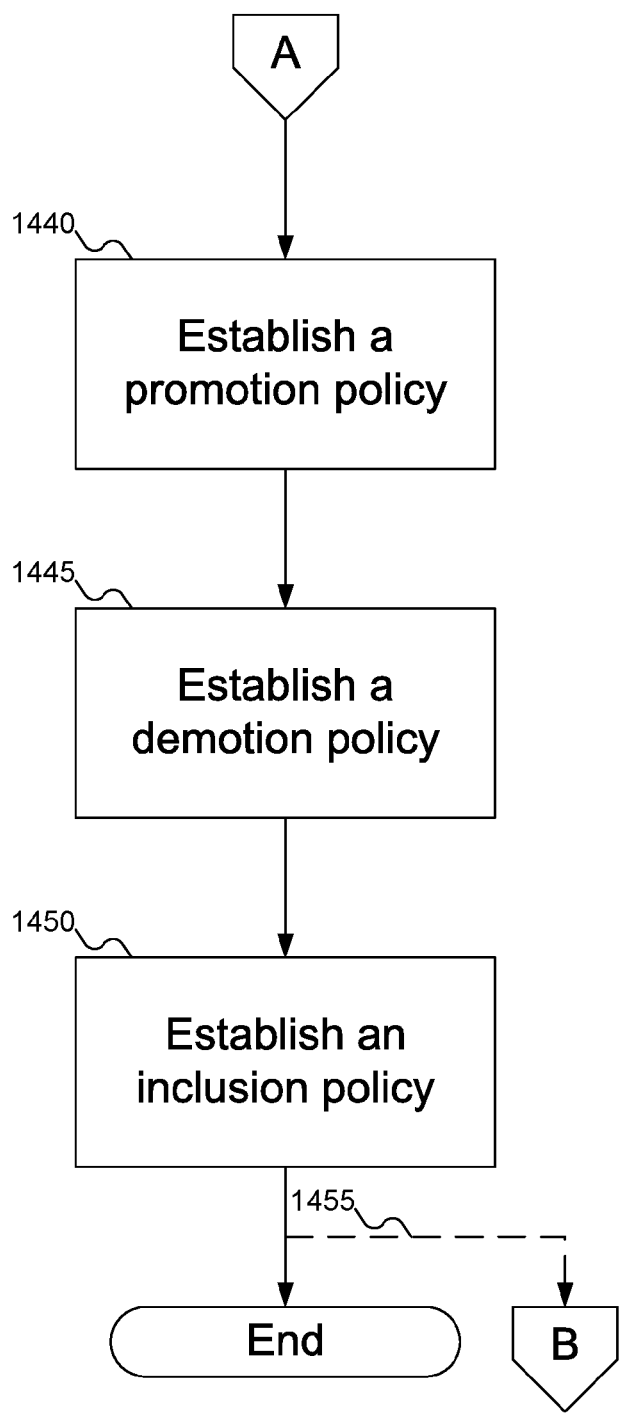

FIGS. 14A-14B show a flowchart of an example procedure for the multi-level cache system of FIG. 3 to configure key-value cache system 140 of FIG. 1 and key-value store 320 of FIG. 3 of the multi-level cache system of FIG. 3, according to an embodiment of the inventive concept. In FIG. 14A, at block 1405 multi-level cache manager 355 of FIG. 3 may determine the capacity of key-value cache system 140 of FIG. 1 (more particularly, the capacity of memory 115 of FIG. 1). At block 1410, multi-level cache manager 355 of FIG. 3 may determine the capacity of key-value stores 320, 325, 330, and 335 of FIG. 3 (more particularly, the capacity of SSDs 130 and 135 of FIG. 1). At block 1415, multi-level cache manager 355 of FIG. 3 may determine the requirements of various namespaces utilizing the distributed database system including server 105 of FIG. 1. At block 1420, multi-level cache manager 355 of FIG. 3 may determine how much of memory 115 of FIG. 1 to allocate for use by key-value cache system 140 of FIG. 1 for each namespace. At block 1425, multi-level cache manager 355 of FIG. 3 may determine how much of SSDs 130 and 135 of FIG. 1 to allocate for use by key-value stores 320, 325, 330, and 335 of FIG. 1 for each namespace. At block 1430, multi-level cache manager 355 of FIG. 3 may perform the allocation of memory 115 of FIG. 1 for each namespace, and at block 1435, multi-level cache manager 355 of FIG. 3 may perform the allocation of SSDs 130 and 135 of FIG. 1 for each namespace.

At block 1440 (FIG. 14B), multi-level cache manager 355 of FIG. 3 may establish a promotion policy. At block 1445, multi-level cache manager 355 of FIG. 3 may establish a demotion policy. And at block 1450, multi-level cache manager 355 of FIG. 3 may establish an inclusion policy. As shown by arrow 1455, Control may then return to block 1415 on FIG. 14A, to enable multi-level cache manager 355 of FIG. 3 to reallocate memory 115 and SSDs 130 and 135 of FIG. 1, if appropriate.

Figure 15A:
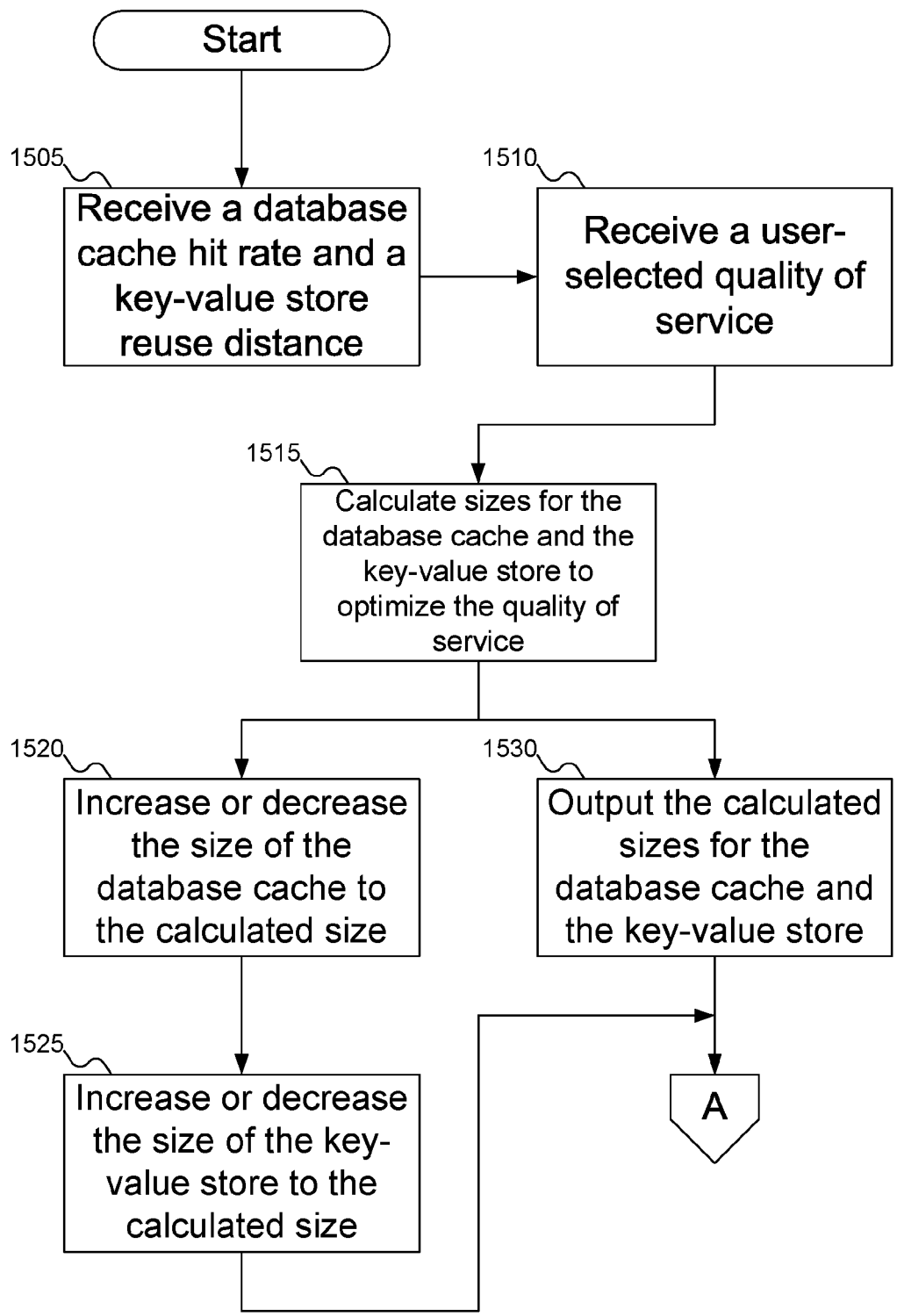
FIGS. 15A-15B show a flowchart of a procedure for calculating the capacities of the key-value cache system and the key-value store of the multi-level cache system of FIG. 3, according to embodiments of the inventive concept.
Figure 15B:
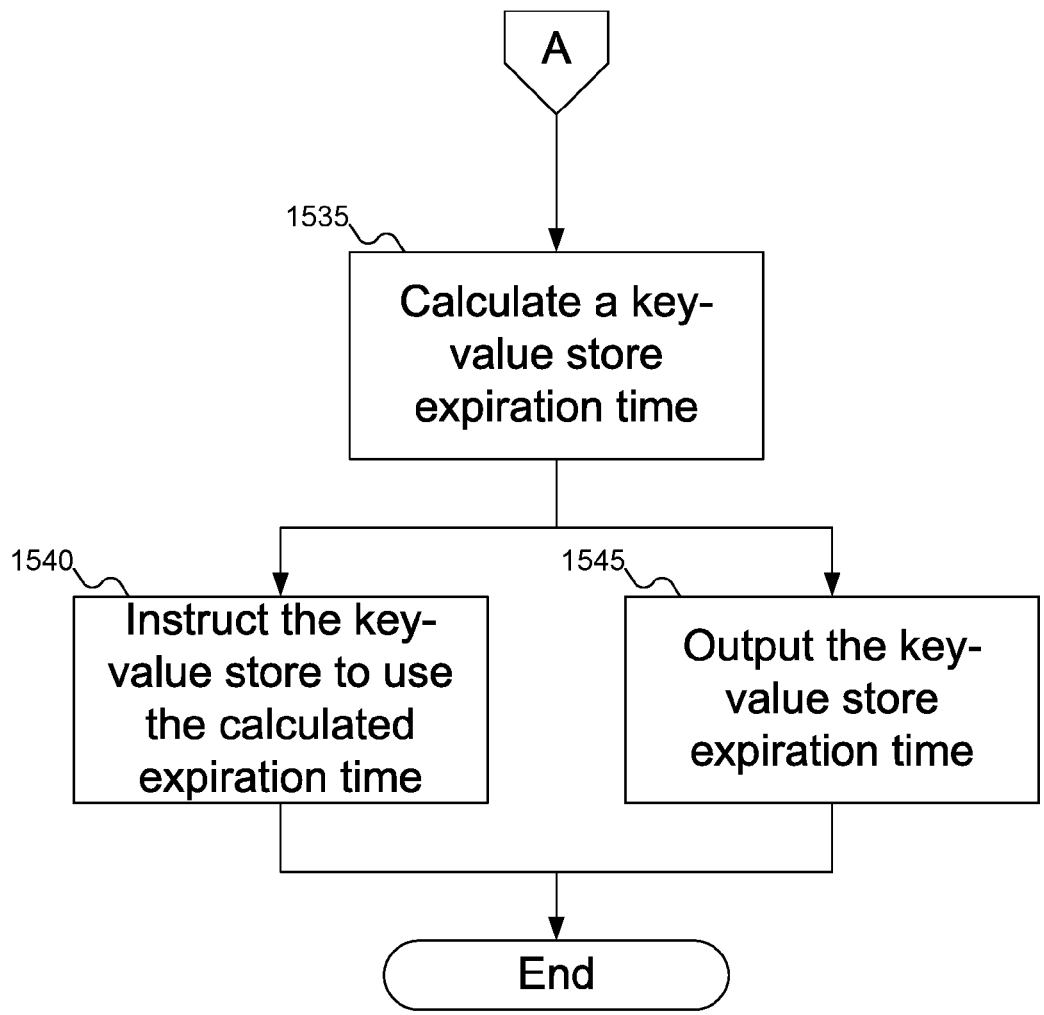

FIGS. 15A-15B show a flowchart of an example procedure for calculating the capacities of key-value cache system 140 of FIG. 1 and key-value store 320 of FIG. 3 of the multi-level cache system of FIG. 3, according to embodiments of the inventive concept. In FIG. 15A, at block 1505, logic 360 of FIG. 3 may receive key-value cache hit rate 1020 of FIG. 10 and reuse distance 1025 of FIG. 10. At block 1510, logic 360 of FIG. 3 may receive user-selected quality of service 1030 of FIG. 10. At block 1515, adaption calculator 1010 of FIG. 10 may calculate sizes for key-value cache system 140 of FIG. 1 and key-value store 320 of FIG. 3 that "optimizes" user-selected quality of service 1030 of FIG. 10.

At this point, different approaches are possible. In some embodiments of the inventive concept, at block 1520, logic 360 of FIG. 3 may change (by increasing or decreasing) the size of key-value cache system 140 of FIG. 1, and at block 1525, logic 360 of FIG. 3 may change (by increasing or decreasing) the size of key-value store 320 of FIG. 3. Alternatively, in other embodiments of the inventive concept, at block 1530, logic 360 of FIG. 3 may output the calculated sizes for key-value cache system 140 of FIG. 1 and/or key-value store 320 of FIG. 3, and leave adjusting the configuration of the multi-level cache system to another component (such as multi-level cache manager 355 of FIG. 3).

Regardless of the approach taken after block 1515, at block 1535 (FIG. 15B), adaption calculator 1010 of FIG. 10 may calculate key-value store expiration time 1035 of FIG. 10. At this point, again, different approaches are possible. In some embodiments of the inventive concept, at block 1540, logic 360 of FIG. 3 may instruct key-value store 320 of FIG. 3 about key-value store expiration time 1035 of FIG. 10. Alternatively, in other embodiments of the inventive concept, logic 360 of FIG. 3 may output key-value store expiration time 1035 of FIG. 10, and leave adjusting the configuration of the multi-level cache system to another component (such as multi-level cache manager 355 of FIG. 3).

Figure 16:
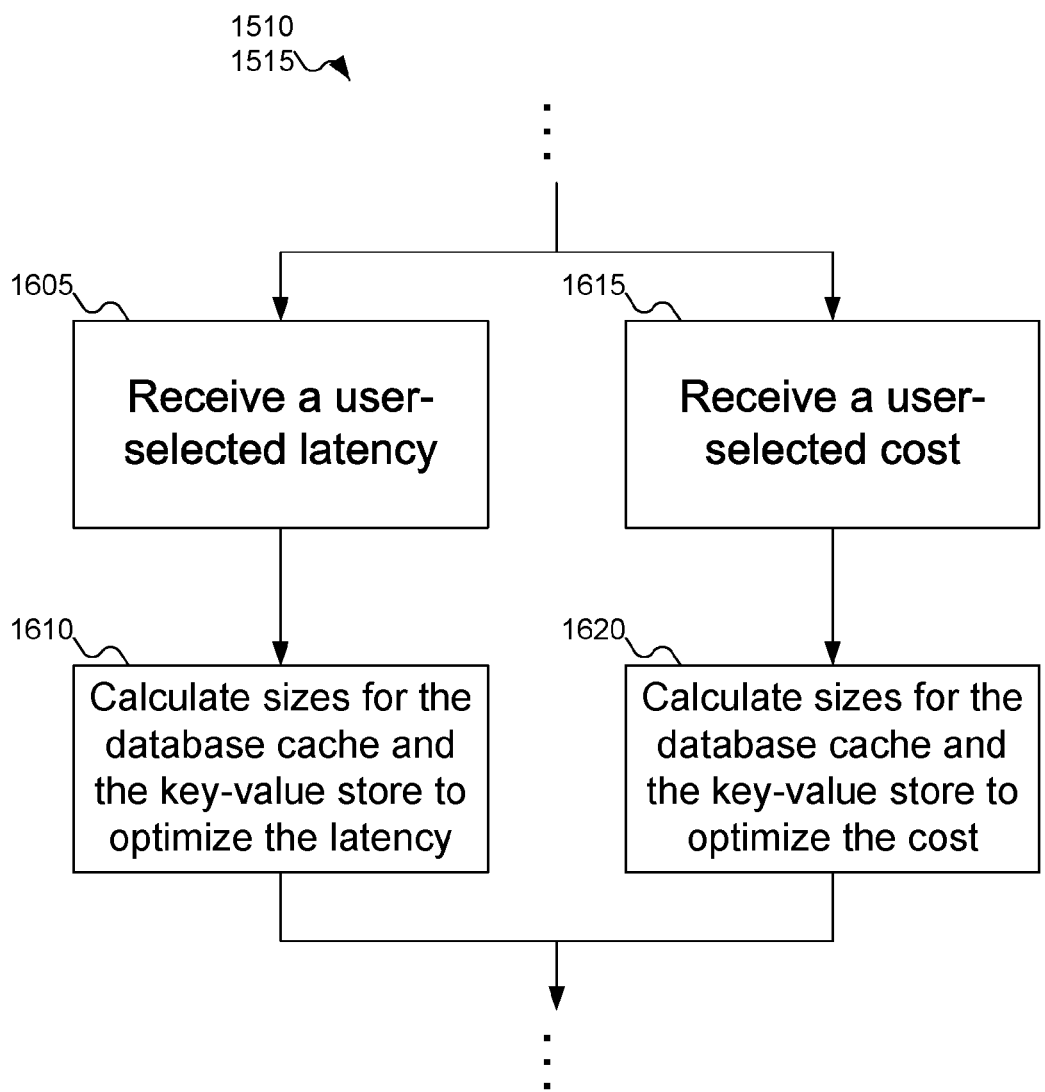
FIG. 16 shows details of the procedure of FIGS. 15A-15B relating to the user-selected quality of service.

FIG. 16 shows details of an example procedure of FIGS. 15A-15B relating to the user-selected quality of service. In FIG. 16, in some embodiments of the inventive concept, at block 1605 logic 360 may receive a user-selected latency, and at block 1610 adaption calculator 1010 of FIG. 10 may calculate sizes for key-value cache system 140 of FIG. 1 and key-value store 320 of FIG. 3 that "optimizes" the user-selected latency. Alternatively, in other embodiments of the inventive concept, at block 1615 logic 360 may receive a user-selected cost, and at block 1620 adaption calculator 1010 of FIG. 10 may calculate sizes for key-value cache system 140 of FIG. 1 and key-value store 320 of FIG. 3 that "optimizes" the user-selected cost.

Figure 17:
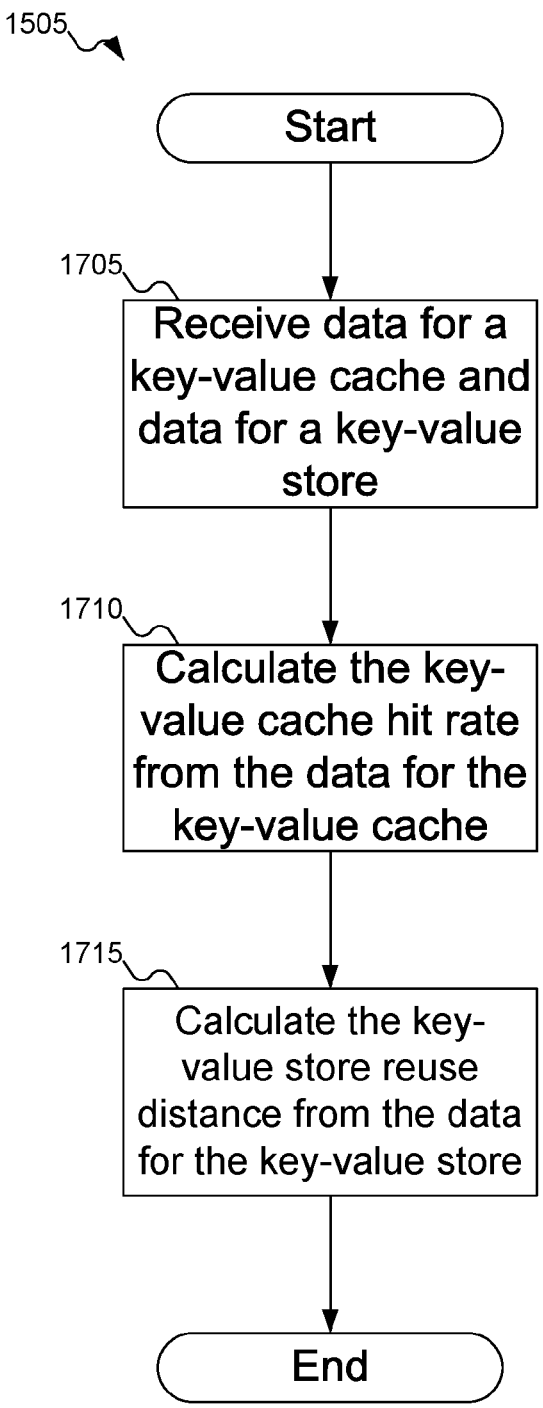
FIG. 17 shows a flowchart of a procedure for calculating the key-value cache hit rate and the key-value store reuse distance in the multi-level cache system of FIG. 3, according to embodiments of the inventive concept.

FIG. 17 shows a flowchart of an example procedure for calculating key-value cache hit rate 1020 of FIG. 10 and key-value store reuse distance of FIG. 10 in the multi-level cache system of FIG. 3, according to embodiments of the inventive concept. In FIG. 17, at block 1705, reception circuitry 1005 of FIG. 10 may receive data for key-value cache system 140 of FIG. 3 and data for key-value store 320 of FIG. 3. At block 1710, statistics calculator 1040 may calculate key-value cache hit rate 1020 from the data for key-value cache system 140 of FIG. 3. At block 1715, statistics calculator 1040 may calculate key-value store reuse distance 1025 from the data for key-value store 320 of FIG. 3.

In FIGS. 13A-17, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a multi-level cache system, comprising:
a server (105);
a processor (110) on the server (105);
a memory (115) on the server (105);
a key-value cache system (140) installed in the memory (115), the key-value cache system (140) operative to store a first key-value pair (305);
a Solid State Drive (SSD) (130, 135), including a key-value store (320, 325, 330, 335), the key-value store (320, 325, 330, 335) operative to store a second key-value pair (340); and
a second storage device (120), including a backend database (125),
wherein the key-value store (320, 325, 330, 335) operates as a second level cache for the key-value cache system (140) in the memory (115).

Statement 2. An embodiment of the inventive concept includes a multi-level cache system according to statement 1, further comprising a multi-level cache manager (355).

Statement 3. An embodiment of the inventive concept includes a multi-level cache system according to statement 2, wherein:
the key-value cache system (140) is used with a first namespace and a second namespace; and
the multi-level cache manager (355) is operative to dynamically allocate how much of the memory (115) is used by the key-value cache system (140) for the first namespace and for the second namespace.

Statement 4. An embodiment of the inventive concept includes a multi-level cache system according to statement 3, wherein the multi-level cache manager (355) is further operative to dynamically allocate how much of the SSD (130, 135) is used by the key-value store (320, 325, 330, 335) for the first namespace and the second namespace.

Statement 5. An embodiment of the inventive concept includes a multi-level cache system according to statement 2, wherein the multi-level cache manager (355) is operative to determine when to promote (620) a third key-value pair (605) from the backend database (125) to the key-value store (320, 325, 330, 335), and when to promote (625) the second key-value pair (340) from the key-value store (320, 325, 330, 335) to the key-value cache system (140).

Statement 6. An embodiment of the inventive concept includes a multi-level cache system according to statement 2, wherein the multi-level cache manager (355) is operative to determine when to demote (630) the first key-value pair (305) from the key-value cache system (140) to the key-value store (320, 325, 330, 335), and when to demote (635) the second key-value pair (340) from the key-value store (320, 325, 330, 335) to the backend database (125).

Statement 7. An embodiment of the inventive concept includes a multi-level cache system according to statement 1, further comprising a glue logic (365) to receive a request (705) for a target value associated with a target key (715).

Statement 8. An embodiment of the inventive concept includes a multi-level cache system according to statement 7, wherein the glue logic (365) is operative to receive the request (705) from a device driver (710).

Statement 9. An embodiment of the inventive concept includes a multi-level cache system according to statement 7, wherein the glue logic (365) includes a translator (750) to translate the request (705) using a syntax appropriate to the key-value store (320, 325, 330, 335).

Statement 10. An embodiment of the inventive concept includes a multi-level cache system according to statement 7, wherein the glue logic (365) includes a library of functions (755) to access the key-value store (320, 325, 330, 335).

Statement 11. An embodiment of the inventive concept includes a multi-level cache system according to statement 7, wherein the glue logic (365) is operative to receive a request (705) for a target value associated with a target key (715) and to direct the request (705) to the key-value cache system (140).

Statement 12. An embodiment of the inventive concept includes a multi-level cache system according to statement 11, wherein the glue logic (365) is further operative to direct the request (705) to the key-value store (320, 325, 330, 335) if the key-value cache system (140) cannot satisfy the request (705).

Statement 13. An embodiment of the inventive concept includes a multi-level cache system according to statement 12, wherein the glue logic (365) is further operative to direct the request (705) to the backend database (125) if the key-value store (320, 325, 330, 335) cannot satisfy the request (705).

Statement 14. An embodiment of the inventive concept includes a multi-level cache system according to statement 7, wherein the glue logic (365) is operative to set an expiration date for the second key-value pair (340).

Statement 15. An embodiment of the inventive concept includes a multi-level cache system according to statement 1, wherein the key-value cache system (140) includes memcached software (140).

Statement 16. An embodiment of the inventive concept includes a multi-level cache according to statement 1, wherein the key-value store (320, 325, 330, 335) includes a key and value interface, wherein upon being supplied a target key (715) the key-value store (320, 325, 330, 335) may return a target value.

Statement 17. An embodiment of the inventive concept includes a multi-level cache according to statement 16, wherein the SSD (130, 135) includes a mapping (805) between the target key (715) and an address on the SSD (130, 135) storing the target value.

Statement 18. An embodiment of the inventive concept includes a multi-level cache according to statement 1, wherein the SSD (130, 135) includes a polymorphic device kernel.

Statement 19. An embodiment of the inventive concept includes a multi-level cache according to statement 18, wherein the polymorphic device kernel may be dynamically changed to alter an interface to the key-value store (320, 325, 330, 335).

Statement 20. An embodiment of the inventive concept includes a multi-level cache system according to statement 1, wherein the key-value store (320, 325, 330, 335) may include the first key-value pair (305) stored in the key-value cache system (140).

Statement 21. An embodiment of the inventive concept includes a multi-level cache system according to statement 1, wherein the key-value store (320, 325, 330, 335) may exclude the first key-value pair (305) stored in the key-value cache system (140).

Statement 22. An embodiment of the inventive concept includes a multi-level cache system according to statement 1, wherein:

the backend database (125) includes a distributed backend database (125); and the second storage device (120) includes a portion of the distributed backend database (125).

Statement 23. An embodiment of the inventive concept includes a method, comprising: receiving (1305) a request (705) to access a target value, the request (705) including a target key (715);

determining (1310) if a key-value pair (305, 340, 605) including the target key (715) exists in a key-value cache (140);

if the key-value pair (305, 340, 605) including the target key (715) does not exist in the key-value cache (140), determining (1320) if the key-value pair (305, 340, 605) including the target key (715) exists in a key-value store (320, 325, 330, 335); and accessing (1325) the target value from the key-value pair (305, 340, 605) using the target key (715) if the key-value pair (305, 340, 605) exists in the key-value store (320, 325, 330, 335).

Statement 24. An embodiment of the inventive concept includes a method according to statement 23, further comprising accessing (1315) the target value from the key-value pair (305, 340, 605) using the target key (715) in the key-value cache (140) if the key-value pair (305, 340, 605) exists in the key-value cache (140).

Statement 25. An embodiment of the inventive concept includes a method according to statement 23, further comprising, if the key-value pair (305, 340, 605) including the target key (715) does not exist in the key-value store (320, 325, 330, 335), accessing (1340) the target value from a backend database (125) using the target key (715).

Statement 26. An embodiment of the inventive concept includes a method according to statement 25, further comprising adding (1345) the target key (715) and the target value as the key-value pair (305, 340, 605) to at least one of the key-value cache (140) and the key-value store (320, 325, 330, 335).

Statement 27. An embodiment of the inventive concept includes a method according to statement 23, further comprising adding (1330) the target key (715) and the target value as the key-value pair (305, 340, 605) to the key-value cache (140).

Statement 28. An embodiment of the inventive concept includes a method according to statement 27, further comprising erasing (1335) the key-value pair (305, 340, 605) from the key-value store (320, 325, 330, 335).

Statement 29. An embodiment of the inventive concept includes a method, comprising:

determining (1405) a first capacity of a key-value cache (140) in a memory (115) in a multi-level cache system;

determining (1410) a second capacity of a key-value store (320, 325, 330, 335) in the multi-level cache system;

determining (1415, 1460) a first set of requirements for a first namespace and a second set of requirements for a second namespace;

calculating (1420) a first portion of the memory (115) for the first namespace and a second portion of the memory (115) for the second namespace;

calculating (1425) a third portion of the key-value store (320, 325, 330, 335) for the first namespace and a fourth portion of the key-value store (320, 325, 330, 335) for the second namespace;

allocating (1430) the first portion of the memory (115) for the first namespace and the second portion of memory (115) for the second namespace; and allocating (1435) the third portion of the key-value store (320, 325, 330, 335) for the first namespace and the fourth portion of the key-value store (320, 325, 330, 335) for the second namespace.

Statement 30. An embodiment of the inventive concept includes a method according to statement 29, further comprising:

periodically (1415, 1460) re-determining the first set of requirements for the first namespace and the second set of requirements for the second namespace;

periodically re-calculating (1420) a first portion of the memory (115) for the first namespace and a second portion of the memory (115) for the second namespace;

periodically re-calculating (1425) a third portion of the key-value store (320, 325, 330, 335) for the first namespace and a fourth portion of the key-value store (320, 325, 330, 335) for the second namespace;

periodically re-allocating (1430) the first portion of the memory (115) for the first namespace and the second portion of memory (115) for the second namespace; and periodically re-allocating (1435) the third portion of the key-value store (320, 325, 330, 335) for the first namespace and the fourth portion of the key-value store (320, 325, 330, 335) for the second namespace.

Statement 31. An embodiment of the inventive concept includes a method according to statement 29, further comprising establishing (1440) a promotion policy to promote a first key-value pair (305) from a backend database (125) to the key-value store (320, 325, 330, 335) and to promote a second key-value pair (340) from the key-value store (320, 325, 330, 335) to the key-value cache (140).

Statement 32. An embodiment of the inventive concept includes a method according to statement 29, further comprising establishing (1445) a demotion policy to demote a first key-value pair (305) from the key-value cache (140) to the key-value store (320, 325, 330, 335) and to demote a second key-value pair (340) from the key-value store (320, 325, 330, 335) to a backend database (125).

Statement 33. An embodiment of the inventive concept includes a method according to statement 29, further comprising establishing (1450) an inclusion policy for the key-value cache (140) and the key-value store (320, 325, 330, 335).

Statement 34. An embodiment of the inventive concept includes a logic (360), comprising:

reception circuitry (1005) to receive a user-selected quality of service (1030);

an adaption calculator (1010) to calculate a target key-value cache size (505, 510) and a target key-value store size (515, 520) based on the user-selected quality of service (1030), a key-value cache hit rate (1020), and a key-value store reuse distance (1025); and transmission circuitry (1015) to transmit the target key-value cache size (505, 510) and the target key-value store size (515, 520).

Statement 35. An embodiment of the inventive concept includes a logic (360) according to statement 34, wherein the reception circuitry (1005) is operative to receive the user-selected quality of service (1030), a key-value cache hit rate (1020), and a key-value store reuse distance (1025).

Statement 36. An embodiment of the inventive concept includes a logic (360) according to statement 34, wherein:

the reception circuitry (1005) is operative to receive a first data for a key-value cache (1040) and a second data for a key-value store (320, 325, 330, 335); and the logic (360) further comprises a statistics calculator (1040) to calculate the key-value cache hit rate (1020) from the first data and the key-value store reuse distance (1025) from the second data.

Statement 37. An embodiment of the inventive concept includes a logic (360) according to statement 34, wherein the adaption calculator (1010) is operative to calculate the target key-value cache size (505, 510), the target key-value store size (515, 520), and a key-value store expiration time (1035); and the transmission circuitry (1015) is operative to transmit the target key-value cache size (505, 510), the target key-value store size (515, 520), and the key-value store expiration time (1035).

Statement 38. An embodiment of the inventive concept includes a logic (360) according to statement 34, wherein the user-selected quality of service (1030) is drawn from a set including a desired latency and a desired cost.

Statement 39. An embodiment of the inventive concept includes a logic (360) according to statement 34, wherein the adaption calculator (1010) is operative to calculate the target key-value cache size (505, 510) and the target key-value store size (515, 520) to optimize the user-selected quality of service (1030).

Statement 40. An embodiment of the inventive concept includes a logic (360) according to statement 39, wherein the adaption calculator (1010) is operative to calculate the target key-value cache size (505, 510) and the target key-value store size (515, 520) using linear programming techniques.

Statement 41. An embodiment of the inventive concept includes a logic (360) according to statement 39, wherein the adaption calculator (1010) is operative to calculate the target key-value cache size (505, 510) and the target key-value store size (515, 520) using integral calculus.

Statement 42. An embodiment of the inventive concept includes a logic (360) according to statement 39, wherein the adaption calculator (1010) is operative to calculate the target key-value cache size (505, 510) and the target key-value store size (515, 520) using machine learning techniques.

Statement 43. An embodiment of the inventive concept includes a logic (360) according to statement 34, wherein the adaption calculator (1010) is operative to calculate latency as a function of the latency of each device multiplied by probability of a hit in the device.

Statement 44. An embodiment of the inventive concept includes a logic (360) according to statement 34, wherein the adaption calculator (1010) is operative to calculate cost as a function of a cost for each device multiplied by the capacity of the device.

Statement 45. An embodiment of the inventive concept includes a logic (360) according to statement 34, wherein:

the target key-value cache size (505, 510) is a memcached software size; and the key-value cache hit rate (1020) is a memcached software hit rate.

Statement 46. An embodiment of the inventive concept includes a method, comprising:

receiving (1505) a key-value cache hit rate (1020) and a reuse distance (1025) for a key-value store (320, 325, 330, 335);

receiving (1510) a user-selected quality of service (1030); and calculating (1515) a target key-value cache size (505, 510) and a target key-value store size (515, 520) to satisfy the user-selected quality of service (1030) based on the key-value cache hit rate (1020) and the reuse distance (1025).

Statement 47. An embodiment of the inventive concept includes a method according to statement 46, wherein receiving (1505) a key-value cache hit rate (1020) and a reuse distance (1025) for a key-value store (320, 325, 330, 335) includes:

receiving (1705) a first data for a key-value cache (1040) and a second data for a key-value store (320, 325, 330, 335);

calculating (1710) the key-value cache hit rate (1020) from the first data; and calculating (1715) the key-value store reuse distance (1025) from the second data.

Statement 48. An embodiment of the inventive concept includes a method according to statement 46, further comprising:

changing (1520) a size of the key-value cache (140) to the target key-value cache size (505, 510); and changing (1525) a size of the key-value store (320, 325, 330, 335) to the target key-value store size (515, 520).

Statement 49. An embodiment of the inventive concept includes a method according to statement 46, further comprising increasing (1520, 1525) at least one of a size of the key-value cache (140) and a size of the key-value store (320, 325, 330, 335).

Statement 50. An embodiment of the inventive concept includes a method according to statement 46, further comprising decreasing (1520, 1525) at least one of a size of the key-value cache (140) and a size of the key-value store (320, 325, 330, 335).

Statement 51. An embodiment of the inventive concept includes a method according to statement 46, wherein:

receiving (1505) a key-value cache hit rate (1020) and a reuse distance for a key-value store (320, 325, 330, 335) includes receiving (1505) a memcached software (140) hit rate and a reuse distance for a key-value store (320, 325, 330, 335); and calculating (1515) a target key-value cache size (505, 510) and a target key-value store size (515, 520) to satisfy the user-selected quality of service (1030) based on the key-value cache hit rate (1020) and the reuse distance includes calculating (1515) a target memcached software (140) size and a target key-value store size (515, 520) to satisfy the user-selected quality of service (1030) based on the memcached software (140) hit rate and the reuse distance.

Statement 52. An embodiment of the inventive concept includes a method according to statement 46, further comprising outputting (1530) the target key-value cache size (505, 510) and the target key-value store size (515, 520).

Statement 53. An embodiment of the inventive concept includes a method according to statement 46, further comprising calculating (1535) a target key-value store expiration time (1035).

Statement 54. An embodiment of the inventive concept includes a method according to statement 53, further comprising instructing (1540) the key-value store (320, 325, 330, 335) to use the target key-value store expiration time (1035) to expire a data that has resided in the key-value store (320, 325, 330, 335) without access for longer than the target key-value store expiration time (1035).

Statement 55. An embodiment of the inventive concept includes a method according to statement 53, further comprising outputting (1545) the target key-value store expiration time (1035).

Statement 56. An embodiment of the inventive concept includes a method according to statement 46, wherein:

receiving (1510) a user-selected quality of service (1030) includes receiving (1605) a user-desired latency; and calculating (1515) a target key-value cache size (505, 510) and a target key-value store size (515, 520) to satisfy the user-selected quality of service (1030) based on the key-value cache hit rate (1020) and the reuse distance includes calculating (1610) the target key-value cache size (505, 510) and the target key-value store size (515, 520) to satisfy the user-desired latency.

Statement 57. An embodiment of the inventive concept includes a method according to statement 46, wherein:

receiving (1510) a user-selected quality of service (1030) includes receiving (1615) a user-desired cost; and calculating (1515) a target key-value cache size (505, 510) and a target key-value store size (515, 520) to satisfy the user-selected quality of service (1030) based on the key-value cache hit rate (1020) and the reuse distance includes calculating (1620) the target key-value cache size (505, 510) and the target key-value store size (515, 520) to satisfy the user-desired cost.

Statement 58. An embodiment of the inventive concept includes an article, comprising a tangible storage medium, said tangible storage medium having stored thereon non-transitory instructions that, when executed by a machine, result in:

receiving (1505) a key-value cache hit rate (1020) and a reuse distance (1025) for a key-value store (320, 325, 330, 335);

receiving (1510) a user-selected quality of service (1030); and calculating (1515) a target key-value cache size (505, 510) and a target key-value store size (515, 520) to satisfy the user-selected quality of service (1030) based on the key-value cache hit rate (1020) and the reuse distance (1025).

Statement 59. An embodiment of the inventive concept includes an article according to statement 58, wherein receiving (1505) a key-value cache hit rate (1020) and a reuse distance (1025) for a key-value store (320, 325, 330, 335) includes:

receiving (1705) a first data for a key-value cache (1040) and a second data for a key-value store (320, 325, 330, 335);

calculating (1710) the key-value cache hit rate (1020) from the first data; and calculating (1715) the key-value store reuse distance (1025) from the second data.

Statement 60. An embodiment of the inventive concept includes an article according to statement 58, said tangible storage medium having stored thereon further non-transitory instructions that, when executed by the machine, result in:

changing (1520) a size of the key-value cache (140) to the target key-value cache size (505, 510); and changing (1525) a size of the key-value store (320, 325, 330, 335) to the target key-value store size (515, 520).

Statement 61. An embodiment of the inventive concept includes an article according to statement 58, said tangible storage medium having stored thereon further non-transitory instructions that, when executed by the machine, result in increasing (1520, 1525) at least one of a size of the key-value cache (140) and a size of the key-value store (320, 325, 330, 335).

Statement 62. An embodiment of the inventive concept includes an article according to statement 58, said tangible storage medium having stored thereon further non-transitory instructions that, when executed by the machine, result in decreasing (1520, 1525) at least one of a size of the key-value cache (140) and a size of the key-value store (320, 325, 330, 335).

Statement 63. An embodiment of the inventive concept includes an article according to statement 58, wherein:

receiving (1505) a key-value cache hit rate (1020) and a reuse distance for a key-value store (320, 325, 330, 335) includes receiving (1505) a memcached software (140) hit rate and a reuse distance for a key-value store (320, 325, 330, 335); and calculating (1515) a target key-value cache size (505, 510) and a target key-value store size (515, 520) to satisfy the user-selected quality of service (1030) based on the key-value cache hit rate (1020) and the reuse distance includes calculating (1515) a target memcached software (140) size and a target key-value store size (515, 520) to satisfy the user-selected quality of service (1030) based on the memcached software (140) hit rate and the reuse distance.

Statement 64. An embodiment of the inventive concept includes an article according to statement 58, said tangible storage medium having stored thereon further non-transitory instructions that, when executed by the machine, result in outputting (1530) the target key-value cache size (505, 510) and the target key-value store size (515, 520).

Statement 65. An embodiment of the inventive concept includes an article according to statement 58, said tangible storage medium having stored thereon further non-transitory instructions that, when executed by the machine, result in calculating (1535) a target key-value store expiration time (1035).

Statement 66. An embodiment of the inventive concept includes an article according to statement 65, said tangible storage medium having stored thereon further non-transitory instructions that, when executed by the machine, result in instructing (1540) the key-value store (320, 325, 330, 335) to use the target key-value store expiration time (1035) to expire a data that has resided in the key-value store (320, 325, 330, 335) without access for longer than the target key-value store expiration time (1035).

Statement 67. An embodiment of the inventive concept includes an article according to statement 65, said tangible storage medium having stored thereon further non-transitory instructions that, when executed by the machine, result in outputting (1545) the target key-value store expiration time (1035).

Statement 68. An embodiment of the inventive concept includes an article according to statement 58, wherein:

receiving (1510) a user-selected quality of service (1030) includes receiving (1605) a user-desired latency; and calculating (1515) a target key-value cache size (505, 510) and a target key-value store size (515, 520) to satisfy the user-selected quality of service (1030) based on the key-value cache hit rate (1020) and the reuse distance includes calculating (1610) the target key-value cache size (505, 510) and the target key-value store size (515, 520) to satisfy the user-desired latency.

Statement 69. An embodiment of the inventive concept includes an article according to statement 58, wherein:

receiving (1510) a user-selected quality of service (1030) includes receiving (1615) a user-desired cost; and calculating (1515) a target key-value cache size (505, 510) and a target key-value store size (515, 520) to satisfy the user-selected quality of service (1030) based on the key-value cache hit rate (1020) and the reuse distance includes calculating (1620) the target key-value cache size (505, 510) and the target key-value store size (515, 520) to satisfy the user-desired cost.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A logic device, comprising:
    reception circuitry to receive a user-selected quality of service;
    an adaption calculator to calculate a target key-value cache size and a target key-value store size based on the user-selected quality of service, a key-value cache hit rate, and a key-value store reuse distance; and
    transmission circuitry to transmit the target key-value cache size and the target key-value store size.

2. A logic device according to claim 1, wherein the reception circuitry is operative to receive the user-selected quality of service, a key-value cache hit rate, and a key-value store reuse distance.

3. A logic device according to claim 1, wherein:
    the reception circuitry is operative to receive a first data for a key-value cache and a second data for a key-value store; and
    the logic further comprises a statistics calculator to calculate the key-value cache hit rate from the first data and the key-value store reuse distance from the second data.

4. An embedded logic device according to claim 3, wherein the key-value store operates as a second level cache to the key-value cache.

5. A logic device according to claim 1, wherein
    the adaption calculator is operative to calculate the target key-value cache size, the target key-value store size, and a key-value store expiration time; and
    the transmission circuitry is operative to transmit the target key-value cache size, the target key-value store size, and the key-value store expiration time.

6. A logic device according to claim 1, wherein the adaption calculator is operative to calculate the target key-value cache size and the target key-value store size to optimize the user-selected quality of service.

7. A logic device according to claim 6, wherein the adaption calculator is operative to calculate the target key-value cache size and the target key-value store size using linear programming techniques.

8. A logic device according to claim 6, wherein the adaption calculator is operative to calculate the target key-value cache size and the target key-value store size using integral calculus.

9. A logic device according to claim 6, wherein the adaption calculator is operative to calculate the target key-value cache size and the target key-value store size using machine learning techniques.

10. A logic device according to claim 1, wherein the adaption calculator is operative to calculate an average latency of a system including multiple devices as a function of the latency of each device multiplied by probability of a hit in the device.

11. A logic device according to claim 1, wherein the adaption calculator is operative to calculate cost as a function of a cost for each device multiplied by the capacity of the device.

12. A method, comprising:
receiving a key-value cache hit rate for a key-value cache and a key-value store reuse distance for a key-value store;
receiving a user-selected quality of service;
calculating a target key-value cache size and a target key-value store size to satisfy the user-selected quality of service based on the key-value cache hit rate and the key-value store reuse distance; and
changing at least one of a size of the key-value cache to the target key-value cache size and a size of the key-value store to the target key-value store size.

13. A method according to claim 12, wherein receiving a key-value cache hit rate and a key-value store reuse distance for a key-value store includes:
receiving a first data for the key-value cache and a second data for the key-value store;
calculating the key-value cache hit rate from the first data; and
calculating the key-value store reuse distance from the second data.

14. A method according to claim 12, further comprising wherein changing at least one of a size of the key-value cache to the target key-value cache size and a size of the key-value store to the target key-value store size includes:
changing the size of the key-value cache to the target key-value cache size; and
changing the size of the key-value store to the target key-value store size.

15. A method according to claim 12, wherein changing at least one of a size of the key-value cache to the target key-value cache size and a size of the key-value store to the target key-value store size includes decreasing at least one of the size of the key-value cache and the size of the key-value store.

16. A method according to claim 12, further comprising calculating a target key-value store expiration time.

17. A method according to claim 16, further comprising instructing the key-value store to use the target key-value store expiration time to expire a data that has resided in the key-value store without access for longer than the target key-value store expiration time.

18. A method according to claim 12, wherein:
receiving a user-selected quality of service includes receiving a user-desired latency; and
calculating a target key-value cache size and a target key-value store size to satisfy the user-selected quality of service based on the key-value cache hit rate and the key-value store reuse distance includes calculating the target key-value cache size and the target key-value store size to satisfy the user-desired latency.

19. A method according to claim 12, wherein:
receiving a user-selected quality of service includes receiving a user-desired cost; and
calculating a target key-value cache size and a target key-value store size to satisfy the user-selected quality of service based on the key-value cache hit rate and the key-value store reuse distance includes calculating the target key-value cache size and the target key-value store size to satisfy the user-desired cost.

20. A method according to claim 12, wherein the key-value store operates as a second level cache to the key-value cache.

21. An article, comprising a tangible storage medium, said tangible storage medium having stored thereon non-transitory instructions that, when executed by a machine, result in:
receiving a key-value cache hit rate for a key-value cache and a key-value store reuse distance for a key-value store;
receiving a user-selected quality of service; and
calculating a target key-value cache size and a target key-value store size to satisfy the user-selected quality of service based on the key-value cache hit rate and the key-value store reuse distance; and
changing at least one of a size of the key-value cache to the target key-value cache size and a size of the key-value store to the target key-value store size.

22. An article according to claim 21, said tangible storage medium having stored thereon further non-transitory instructions that, when executed by the machine, result in outputting the target key-value cache size and the target key-value store size.

23. An article according to claim 21, wherein the key-value store operates as a second level cache to the key-value cache.

* * * * *